United States Patent [19]

Benham et al.

[11] Patent Number: 5,763,716
[45] Date of Patent: Jun. 9, 1998

[54] PROCESS FOR THE PRODUCTION OF HYDROCARBONS

[75] Inventors: Charles B. Benham, Arvada; Mark S. Bohn, Golden; Dennis L. Yakobson, Westminster, all of Colo.

[73] Assignee: Rentech, Inc., Denver, Colo.

[21] Appl. No.: 834,837

[22] Filed: Apr. 10, 1997

Related U.S. Application Data

[63] Continuation of Ser. No. 428,793, Apr. 24, 1995, Pat. No. 5,621,155, which is a continuation of Ser. No. 140,479, Nov. 18, 1993, abandoned, which is a division of Ser. No. 867,456, Apr. 13, 1992, Pat. No. 5,324,335, which is a continuation-in-part of Ser. No. 806,267, Dec. 13, 1991, abandoned, which is a continuation-in-part of Ser. No. 528,499, May 25, 1990, abandoned, which is a continuation of Ser. No. 861,535, May 8, 1986, abandoned.

[51] Int. Cl.⁶ .................. C07C 1/04; C07C 1/12
[52] U.S. Cl. .................. 585/315; 585/314; 585/640; 585/733; 518/702; 518/704; 518/719; 518/721
[58] Field of Search .................. 585/310, 469, 585/733, 321, 322, 315, 640, 314; 518/703, 704, 713, 715, 719, 721

[56] References Cited

U.S. PATENT DOCUMENTS

| | | |
|---|---|---|
| 4,059,648 | 11/1977 | Derr et al. |
| 4,256,654 | 3/1981 | Schlinger et al. |
| 4,579,985 | 4/1986 | Minderhoud et al. |
| 4,595,702 | 6/1986 | Chu et al. |
| 4,605,639 | 8/1986 | Dyer et al. |
| 4,617,288 | 10/1986 | Bell et al. |
| 4,994,428 | 2/1991 | Bell et al. |
| 5,023,276 | 6/1991 | Yarrington et al. |

Primary Examiner—Bekir L. Yildirim
Attorney, Agent, or Firm—Shoemaker & Mattare

[57] ABSTRACT

A process of converting a feed of hydrocarbon-containing gases into liquid hydrocarbon products including a first reaction of converting the feed into one to 2.5 parts of hydrogen to one part carbon monoxide in the presence of carbon dioxide and then secondly reacting the hydrogen and carbon monoxide in a Fischer-Tropsch synthesis reactor using a promoted iron oxide catalyst slurry to form liquid hydrocarbon products, wherein the carbon dioxide from the first and second reactions is separated from the product streams and at least a portion of the separated carbon dioxide is recycled into the first reaction feed and the hydrocarbon products are separated by distillation and a normally gaseous portion of the separated products are further reacted in another Fischer-Tropsch synthesis reactor to produce additional liquid hydrocarbon product.

3 Claims, 13 Drawing Sheets

PROCESS FOR THE PRODUCTION OF HYDROCARBONS

This application is continuation of application Ser. No. 08/428,793, filed Apr. 24, 1995, now U.S. Pat. No. 5,621,155, which is a continuation of 08/140,479, filed Nov. 18, 1993 now abandoned; which is a division of 07/867,456, filed Apr. 15, 1992 (now U.S. Pat. No. 5,324,335); which is a CIP of 07/806,267, filed Dec. 31, 1991, now abandoned; which is a CIP of 07/528,499, filed May 25, 1990, now abandoned; which is a continuation of 06/861,535, filed May 8, 1986, now abandoned.

BACKGROUND OF THE INVENTION

This invention relates to a method and a system for the production of hydrocarbons and hydrocarbon compounds which includes the use of a Fischer-Tropsch synthesis reactor and process, utilizing a promoted iron-based catalyst, in combination with processes for converting hydrocarbon-containing gases in general, and in particular, methane rich gases, into hydrogen and carbon monoxide from such gases.

Considerable research and development work has been undertaken in the past to commercially apply the Fischer-Tropsch synthesis of hydrocarbons, starting from a wide variety of carbonaceous and hydrocarbon starting materials.

A compendium of some of the prior work with Fischer-Tropsch synthesis technology is contained in the Bureau of Mines Bulletin 544 (1955) entitled *Bibliography of the Fischer-Tropsch Synthesis and Related Processes* by H. C. Anderson, J. L. Wiley and A. Newell.

The product distribution and yields from specific Fisher-Tropsch reactions with iron catalysts have also been examined by Charles N. Satterfield and George A. Huff, Jr. in an article entitled *Carbon Number Distribution of Fischer-Tropsch Products Formed on an Iron Catalyst in a Slurry Reactor*, Journal of Catalysis 73, 187–197 (1982), wherein the Shultz-Flory distribution is examined with respect to various catalyst systems.

In addition, the article entitled *Fischer-Tropsch Processes Investigated at the Pittsburgh Energy Technology Center Since 1944* by Baird, Schehl, and Haynes in Industrial and Engineering Chemistry, Product Research and Development, 1980, 19, pages 175–191, describes various Fischer-Tropsch reactor configurations.

The foregoing articles describe in considerable detail how specific catalysts can be employed in various reaction vessel configurations under conditions which favor the conversion of carbon monoxide and hydrogen into specific product groups.

There have only been a few instances wherein the Fischer-Tropsch reaction has been incorporated into a complete system, starting with a solid or gaseous feed stock. Germany placed several plants in operation during the 1930's and 1940's using coal as the feed stock, referenced in *Twenty-Five Years of Synthesis of Gasoline by Catalytic Conversion of Carbon Monoxide and Hydrogen*, Helmut Pichler, Advances in Catalysis, 1952, Vol. 4, pp. 272–341. In addition to the foregoing, South Africa has been using Fischer-Tropsch technology based upon this German work for the past 35 years to produce gasoline and a variety of other products from coal, referenced in *Sasol Upgrades Synfuels with Refining Technology*, J. S. Swart, G. J. Czajkowski, and R. E. Conser, Oil & Gas Journal, Aug. 31, 1991, TECHNOLOGY. There was also a Fischer-Tropsch plant built in the late 1940's to convert natural gas to gasoline and diesel fuel described in *Carthage Hydrocol Project* by G. Weber, Oil Gas Journal, 1949, Vol. 47, No. 47, pp. 248–250. These early efforts confirmed that commercial application of the Fischer-Tropsch process for the synthesis of hydrocarbons from a hydrocarbon-containing feed stock gas requires solving, in an economical manner, a set of complex problems associated with the complete system. For example, initially, it is important for the hydrocarbon-containing feed stock to be converted into a mixture consisting essentially of hydrogen and carbon monoxide before introduction of the mixture into the Fischer-Tropsch reactor. Economic operation of specific sizes of Fischer-Tropsch reactors, generally requires the ratio of hydrogen to carbon monoxide to be within well established ranges. The Hydrocol plant, referenced hereinbefore, used partial oxidation of natural gas to achieve a hydrogen to carbon monoxide ratio of about 2.0. An alternative approach to partial oxidation uses steam reforming for converting light hydrocarbon-containing gases into a mixture of hydrogen and carbon monoxide. In this latter case, steam and carbon dioxide, methane and water are employed as feed stocks and carbon dioxide can be recycled from the output of the reformer back to its inlet for the purpose of reducing the resultant hydrogen to carbon monoxide ratio.

There are therefore, two primary methods for producing synthesis gas from methane: steam reforming and partial oxidation.

Steam reforming of methane takes place according to the following reaction:

$$H_2O + CH_4 = 3H_2 + CO \qquad (1)$$

Since both steam and carbon monoxide are present, the water gas shift reaction also takes place:

$$H_2O + CO = H_2 + CO_2 \qquad (2)$$

Both of these reactions are reversible, i.e., the extent to which they proceed as written depends upon the conditions of temperature and pressure employed. High temperature and low pressure favor the production of synthesis gas.

Partial oxidation reactions utilize a limited amount of oxygen with hydrocarbon-containing gases, such as methane, to produce hydrogen and carbon monoxide, as shown in equation (3), instead of water and carbon dioxide in the case of complete oxidation.

$$\tfrac{1}{2} O_2 + CH_4 \rightarrow 2H_2 + CO \qquad (3)$$

In actuality, this reaction is difficult to carry out as written. There will always be some production of water and carbon dioxide; therefore the water gas shift reaction (2) will also take place. As in the steam reforming case, relatively high temperatures and relatively low pressures favor production of synthesis gas.

The primary advantage of partial oxidation over steam reforming is that once the reactants have been preheated, the reaction is self-sustaining without the need for the addition of heat.

Another advantage of partial oxidation is the lower ratios of hydrogen to carbon monoxide normally produced in the synthesis gas which ratios better match the desired ratio for use in the Fischer-Tropsch synthesis of hydrocarbon liquids in the overall process.

A still further advantage of partial oxidation resides in the elimination of a need for the removal of carbon dioxide and/or hydrogen from the synthesis gas before being fed to the synthesis reactors.

While adjustment of the hydrogen to carbon monoxide ratio can be achieved by removal of excess hydrogen using a membrane separator, for example. This approach requires additional capital equipment and can result in lower oil or liquid hyrdrocarbon yields due to a loss of hydrogen to the process.

In order for the overall process considerations to be used in a manner which can produce economical results whether employing either steam reforming or partial oxidation of a feed stock, the Fischer-Tropsch reactor must typically be able to convert at least 90% of the incoming carbon monoxide. If a 90% conversion efficiency is to be achieved in single pass operation and hydrogen is not removed before introduction of the gas stream into the reactor, the build up of unreacted hydrogen due to the excess of hydrogen will necessitate a larger reaction vessel to maintain a sufficiently long residence time in the reaction vessel. Recycle of unreacted hydrogen and carbon monoxide from the outlet of the Fischer-Tropsch reactor back to its inlet is commonly employed to achieve the required conversion. However, when an excess of hydrogen is employed, an even greater excess of unreacted hydrogen will build up under such a recycle operation. This condition, in turn, can necessitate an even larger reaction vessel or alternatively the hydrogen removal described must be employed.

Major drawbacks to the commercialization of many of the prior processes were the high cost of product specific catalysts, and when an inexpensive catalyst was utilized an unacceptable overall process conversion efficiency of the carbon input into the hydrocarbon products produced.

The two catalyst types attracting the most serious attention for the Fischer-Tropsch reaction are either cobalt based or iron-based catalysts. In practice, a cobalt-based catalyst will favor the following reaction:

$$CO + 2H_2 \rightarrow (-CH_2-) + H_2O \qquad (4)$$

While an iron catalyst will favor the following overall reaction (due to its high water gas shift activity):

$$2CO + H_2 \rightarrow (-CH_2-) + CO_2 \qquad (5)$$

Theoretically, cobalt-based catalysts can produce higher conversion yields than iron-based catalysts since cobalt can approach 100% carbon conversion efficiency, whereas iron tends toward 50% carbon conversion efficiency during the Fischer-Tropsch synthesis reaction since the reaction (5) favors the production of carbon in the form of $CO_2$. The major drawbacks encountered are, first, that cobalt-based catalysts are very expensive compared to iron-based catalysts and, further, if the Fischer-Tropsch technology was embraced worldwide on a large scale, the higher demand for relatively scarce cobalt might drive the cost even higher.

The use of cobalt-based catalysts has typically included recycle of tail effluent back to the inlet of the Fischer-Tropsch reactor to achieve 90% conversion primarily because cobalt favors formation of water. Too much water has been considered to be an inhibitor of either catalytic reaction scheme. Thus, as the reaction proceeds in the presence of water, not only is the concentration of reactants less, but the concentration of inhibiting water vapor is greater. In practice, generally 70% carbon monoxide conversion is the maximum attainable in single-pass operation using a cobalt-based catalyst. Iron-based catalysts, which favor carbon dioxide formation permit up to 90% of the theoretical conversion of carbon monoxide per pass without great difficulty, and without the formation of additional water, thereby eliminating the necessity for effluent recycle back to the inlet of the Fischer-Tropsch reactor.

It has generally been considered undesirable to form $CO_2$ in the Fischer-Tropsch synthesis reaction as happens using iron-based catalysts and therefore many process schemes use cobalt-based catalysts including the recycle of some of the reactor effluent directly back into the Fischer-Tropsch reactor. In summary, therefore, iron-based catalysts, while efficient in converting carbon monoxide into the products shown in equation (5), have previously been limited in overall carbon conversion efficiency since their use favors the production of carbon dioxide, and therefore, they were not as efficient in overall carbon conversion efficiency to hydrocarbon products compared to the process schemes utilizing cobalt based catalysts.

The Fischer-Tropsch synthesis has commercially therefore been used in combination with an up-stream steam reforming reactor which must then be followed by $CO_2$ removal from the carbon monoxide and hydrogen reaction products before the CO and $H_2$ synthesis gas produced by the steam reforming reaction are subjected to a Fischer-Tropsch reaction using cobalt-based catalysts.

In selecting a suitable catalyst for use in a system which favors reaction (5), several considerations are important. In the Fischer-Tropsch synthesis using appropriately designed equipment, the hydrogen to carbon monoxide feed ratio to the Fischer-Tropsch reactor will optimally be in the range of from 0.6 to 2.5 parts of hydrogen for every part of carbon monoxide. This is necessary in order to obtain reasonably acceptable percent conversion of carbon monoxide into hydrocarbon per pass through the Fischer-Tropsch reactor without the undesirable formation of carbon in the catalyst bed.

In order to provide the $H_2/CO$ ratio in the range of optimum ratios described hereinbefore for the catalyst selected, it is necessary and typical that an additional stage of hydrogen removal, by a membrane or the like, is inserted into the product stream between the steam reformer and the Fischer-Tropsch reactor.

The present invention overcomes the foregoing difficulties, and provides a novel, unobvious and effective economically viable natural gas to oil conversion process using steam reforming or partial oxidation and a Fischer-Tropsch synthesis using a promoted iron-based unsupported catalyst in a slurry reactor. The present invention includes a solution to the problems of reducing the formation of excess hydrogen from the reformer or partial oxidation unit and increasing the overall carbon conversion efficiency for the entire carbon input to the system when using specifically prepared promoted iron catalysts. As will be shown hereinafter, the carbon dioxide produced by such iron catalysts, contributes to the low carbon conversion efficiencies previously discussed, and can be used to solve both the excess hydrogen and low overall carbon conversion efficiency problems.

OBJECTS OF THE INVENTION

It is therefore an object of the present invention to utilize specific low-cost catalysts which favor the formation of carbon dioxide, in a Fischer-Tropsch slurry reactor to efficiently produce hydrocarbon products, with or without the necessity for recycling gaseous effluent directly back into the Fischer-Tropsch reaction zone.

It is still a further object of the present invention to utilize reactions which produce hydrogen and carbon monoxide, such as steam reforming and partial oxygenation reactions wherein the hydrogen to carbon monoxide ratios produced can be used directly in an appropriately designed Fischer-Tropsch synthesis reactor using specific iron-based catalysts, without the further step of removing hydrogen.

It is still a further object of the present invention to produce the hydrogen to carbon monoxide ratios required for specific equipment designs in a Fischer-Tropsch synthesis by the use of sufficient carbon dioxide in the steam reforming or partial oxidation reactions to promote improved carbon conversion efficiency in the reactions of hydrocarbon-containing gases to hydrogen and carbon monoxide.

A further object of the present invention is to produce the requisite hydrogen and carbon monoxide necessary for a Fischer-Tropsch synthesis by recycling the carbon dioxide and optionally the light hydrocarbon gases, and aqueous phase product containing alcohol, aldehydes and acids formed in the Fischer-Tropsch reaction into the feed stream of either a steam reformer reactor or partial oxidation unit for producing a synthesis gas containing the desired ratios of hydrogen and carbon monoxide.

It is yet another object of the present invention is to provide a process for the efficient conversion of hydrocarbon-containing gases and low B.T.U. gases, such as hydrocarbon-containing natural gas having relatively high concentrations of carbon dioxide into desired hydrocarbon-containing products having more than five carbon atoms, including liquid hydrocarbon products such as naphtha, diesel fuel, and hydrocarbon waxes, which process is highly efficient in converting the process total carbon input into carbon in the hydrocarbon products.

Another object of the present invention is to increase the selectivity of the Fischer-Tropsch reaction towards higher molecular weight compounds and to increase the carbon conversion efficiency by recycling tail gases rich in olefins, alcohols and aldehydes, back to the Fischer-Tropsch reactor inlet. The recycled olefins, alcohols and aldehydes are readsorbed on the catalyst and participate in further chain growth.

It is yet a further object of the present invention to increase the selectivity of the Fischer-Tropsch reaction towards higher molecular weight compounds and to increase the carbon conversion efficiency by recycling back to the Fischer-Tropsch reactor inlet naphtha and light diesel which are rich in olefins and which contain a relatively large amount of alcohols. The recycled olefins and oxygenates such as alcohols and aldehydes are readsorbed on the catalyst and participate in further chain growth.

A further object of the present invention is to convert residual hydrogen and carbon dioxide, which otherwise would be vented or used for fuel, in a second Fischer-Tropsch reactor for conversion into gaseous and liquid hydrocarbon products which can be used directly or selectively recycled as previously described thereby improving the overall carbon conversion efficiency.

It is one further object of the present invention to produce a catalyst having high activity and specificity in the production of predominantly hydrocarbon containing products having more than five carbon atoms.

BRIEF SUMMARY OF THE INVENTION

One aspect of the present invention relates to a process for the conversion of hydrocarbon-containing gases, including low B.T.U. hydrocarbon gases, from whatever source derived, into liquid hydrocarbon products. Such gases, once obtained, are first converted into hydrogen and carbon monoxide in either a steam reforming reactor or partial oxidation unit. These gases are subsequently converted in a slurry-type Fischer-Tropsch reactor into carbon dioxide and hydrocarbon products containing more than five carbon atoms each, including gaseous hydrocarbons, liquid hydrocarbons, waxes and oxygenated hydrocarbons utilizing a specific promoted iron-based catalyst. Some or all of the carbon dioxide from the Fischer-Tropsch reaction is preferably mixed with the starting hydrocarbon-containing gases, before their conversion into hydrogen and carbon monoxide. In one preferred embodiment, carbon dioxide is removed from the resultant hydrogen and carbon monoxide stream before introduction of the gases into the Fischer-Tropsch reactor. The thus removed carbon dioxide can also optionally be added to the starting materials to obtain the desired ratios of hydrogen to carbon monoxide if that addition is desirable or necessary.

An overall system for the practice involving the foregoing conversion process has also been developed whereby a methane-containing gas stream can be converted to liquid hydrocarbon products utilizing means which can include: steam reforming means or partial oxidation means, to produce a gas stream containing hydrogen, carbon monoxide and carbon dioxide; carbon dioxide removal means for removing carbon dioxide from the gas stream; Fischer-Tropsch slurry reactor means utilizing an iron-based promoted catalyst and employing conditions which will catalytically convert the hydrogen and carbon monoxide into various hydrocarbon products and most desirably those having more than five carbon atoms, and carbon dioxide; carbon dioxide removal means for removing the carbon dioxide produced in the Fischer-Tropsch reactor means; and recycle means for introducing a predetermined quantity of the removed carbon dioxide to the gas stream entering the steam reforming means or partial oxidation means; whereby the hydrogen to carbon monoxide ratio entering the Fischer-Tropsch reactor means is selected in the system to produce an improvement in the overall carbon conversion efficiency of the process.

A second Fischer-Tropsch slurry reactor means utilizing the iron-based catalyst can also be employed utilizing conditions which will catalytically convert gaseous hydrocarbon products from the first reactor into hydrocarbon products having more than five carbon atoms, water and hydrocarbon oxygenates, suitable for use as previously described.

DETAILED DESCRIPTION OF THE INVENTION

Figure 1:
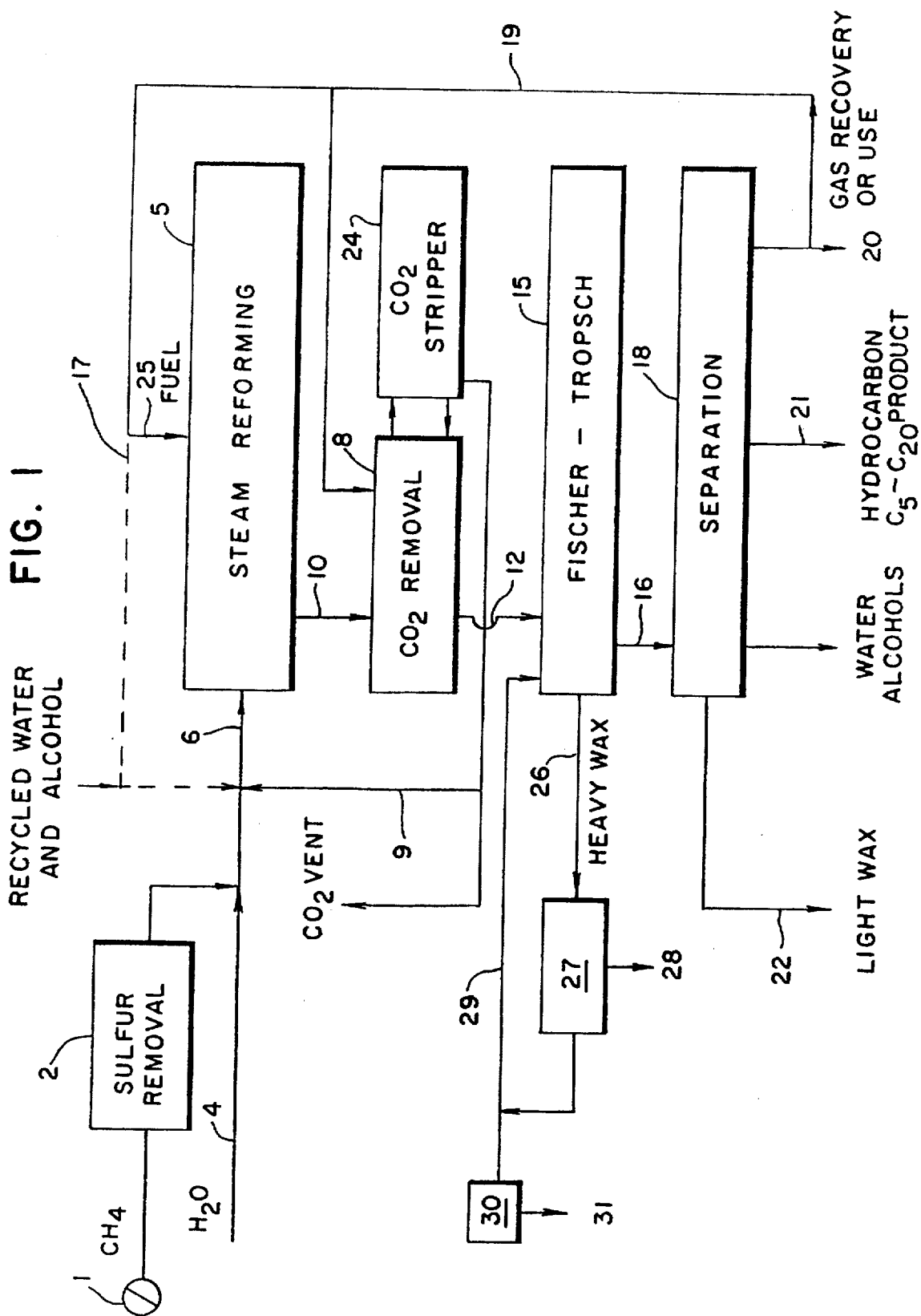
FIG. 1 is a schematic of one embodiment of the process of the present invention.

Referring to FIG. 1, hydrocarbon-containing gases such as methane containing gases are introduced at 1. The hydrocarbon containing gases used must be suitable for use in the process of the present invention, and are preferably made to undergo sulfur removal at 2 before being introduced into the steam reforming reactor 5. Any conventional equipment for this sulfur removing step can be utilized, such as a packed bed described hereinafter. Typically, a granular bed of zinc oxide such as 32-4 obtained from Katalco in ⅛ to 3/16 inch (3–5 mm) spheres can be used. System pressure can be used in the sulfur removal process which typically is operated preferably at between 200° C. and 500° C. and more preferably at between 350° C. and 400° C. and most preferably at about 375° C. The space velocity through the reactor or bed should preferably be between 400 and 1000 standard cubic feet per hour per cubic feet of bed, and more preferably between 600 and 800 standard cubic feet per hour per cubic feet of bed, and most preferably about 700 standard cubic feet per hour per cubic feet of bed.

The hydrocarbon gas after sulfur removal is then mixed with $H_2O$ stream 4 to form a stream 6 before introduction into the steam reformer 5.

A unique advantage of the present invention is the ability of the particular process described herein to tolerate, indeed to require, predetermined high levels of carbon dioxide in the process stream 6 entering the steam reformer, or other producer or source of hydrogen and carbon monoxide used. Hydrocarbon gases that are high in $CO_2$ concentration at a preselected system pressure can also be employed with advantage. This permits the use of gases produced by pyrolysis of hydrocarbon sources as well as gases from wells or other sources that are low in B.T.U. content by virtue of having high concentrations of carbon dioxide. Typically the gas stream 6 entering the reformer can contain one atom of carbon in the hydrocarbon gases to a total of up to four, and more preferably, about three molecules of carbon dioxide and water. The number of carbon dioxide molecules is less than or equal to twice the number of carbon atoms in the hydrocarbons contained in the feed gas stream 6. The proportions selected should also be adjusted to reduce the formation of elemental carbon in the steam reformer. Different proportions can be used where additional steam is employed. For example, less than four molecules of carbon dioxide and water may be employed so long as the overall reaction does not promote the excessive formation of elemental carbon in the reformer. The recycle stream 9 containing carbon dioxide from the $CO_2$ removal and recovery stage 24 is combined with the stream 6 to produce a preselected ratio of carbon to water and carbon dioxide entering the reformer 5. Depending on the concentration of carbon dioxide in the original hydrocarbon gas 1 or the total amount of carbon dioxide from the original hydrocarbon gas 1 and the light hydrocarbon gas recycle 17, the addition of carbon dioxide to the gas stream 6 can be adjusted by control of the input of carbon dioxide 8 from the $CO_2$ removal and recovery stage 24. See FIG. 1.

The steam reforming reactor 5 can be of conventional design employing a commercial nickel catalyst such as obtained from Katalco and designated as 23-1. Preferably, the reactor should be operated at from about 1292° F. (700° C.) to about 1652° F. (900° C.) at system pressure of about 12 psia (82.7 kPa) to about 500 psia (3447 kPa). The flow of input gases through the reactor catalyst bed should be approximately 300 lbs/hr/ft$^3$ catalyst.

The gas streams 6, 10, 12 and 16 can be operated, as previously described, at system pressure or at some other pressure by appropriate pressure reduction apparatus or with compression. The components of the system can be designed to tolerate a wide variation in operating pressure as desired. The selection of a system pressure as described herein, has been found to produce the unexpected benefits and advantages described.

Figure 2:
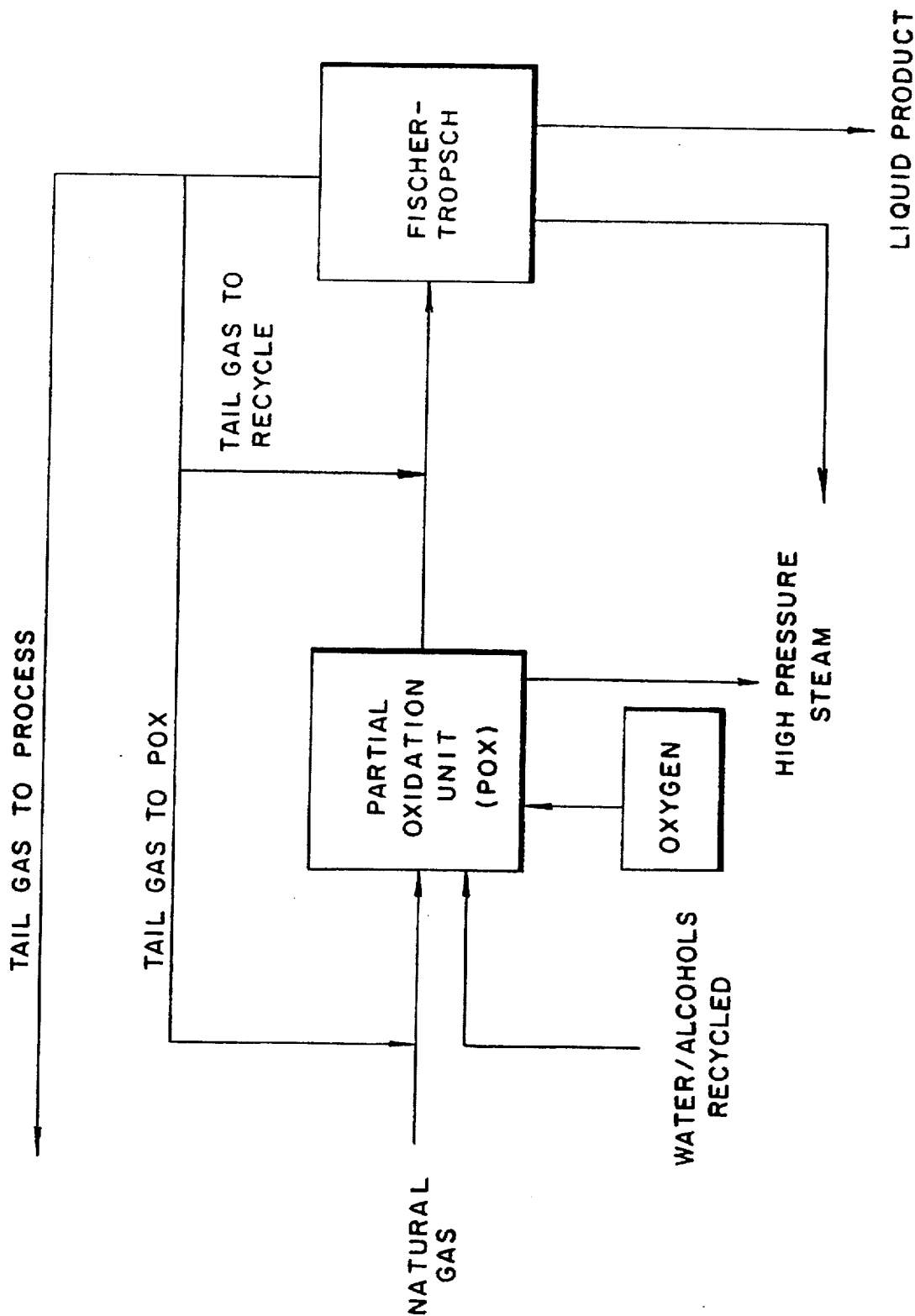
FIG. 2 is a schematic of another embodiment of the process of the present invention using partial oxidation means.

A partial oxidation reaction as shown generally in FIG. 2 may be employed or may be substituted for the steam reforming stage 5 of the process shown in FIG. 1.

After the steam reforming step, the hydrogen, carbon monoxide and carbon dioxide-containing gas stream 10 is subjected to a carbon dioxide removal step by absorption as described hereinafter. The gases having a reduced carbon dioxide content are then passed on at 12 to the Fischer-Tropsch reactor. Preferably, such a $CO_2$ removal apparatus should reduce the concentration of carbon dioxide in the gas stream 12 to less than about 5% by volume for optimum use in the Fischer-Tropsch reactor 15. One of the preferred practices for such $CO_2$ removal is the use of an aqueous potassium carbonate solution containing about 30% potassium carbonate with which the carbon dioxide-containing gas is contacted. Preferably, the absorption should take place by bubbling the $CO_2$ rich gas through the carbonate solution at a temperature of from about 100° C. to about 115° C., and more preferably from about 105° C. to about 110° C. and most preferably at about 105° C., at the system pressure previously identified. Higher or lower pressures will, of course, require optimizing the temperature and throughput for a given absorber size to achieve the same or similar desired reduction in the concentration of the carbon dioxide in the gas stream 12. The potassium carbonate solution containing dissolved $CO_2$, i.e., the rich solution, is then heated in a separate vessel to drive off the absorbed carbon dioxide preferably at reduced pressure with steam stripping. The resulting stripped, i.e., lean solution, is then returned to the absorption vessel to absorb more carbon dioxide from the gases 10 from the steam reformer 5. Other $CO_2$ removal schemes well known in the art can be employed, such as those using amines.

The hydrogen and carbon monoxide-containing gas stream 12 is then introduced into a Fischer-Tropsch reactor which employs a catalyst slurry using an iron-based catalyst and preferably a precipitated iron catalyst and most preferably a precipitated iron catalyst that is promoted with predetermined amounts of potassium and copper depending on the preselected probability of linear condensation polymerization, i.e. chain growth, and product molecular weight distribution sought.

There are three fundamental aspects to producing a catalyst for a particular application: (1) composition, (2) method of preparation, and (3) procedure for its activation.

The preferred catalyst herein is an unsupported precipitated iron catalyst promoted with copper and potassium. The catalyst is made using elemental iron and copper as starting materials.

The first step in the cataylst preparation process is dissolution of the starting metals in nitric acid to form a mixture of ferrous nitrate, ferric nitrate and cupric nitrate in appropriate proportions. The ratio of water to acid is an important parameter and should be adjusted to give a weight ratio of about 6:1. The dissolution of the metals in nitric acid either by the addition of the metal to the acid or the acid to the metal produces an evolution of nitrogen oxides, principally nitric oxide and nitrogen dioxide. Nitric oxide has limited solubility in the acid, but can be readily oxidized to nitrogen dioxide by contact with air or oxygen. Nitrogen dioxide dissolves in water producing nitric acid and nitric oxide, respectively. Therefore, in order to reduce nitrogen oxide emissions from the reaction vessel and, at the same time, to reduce the consumption of nitric acid needed for dissolution of the metals, oxygen is bubbled through the solution while the metals are being dissolved. The small amount of nitrogen dioxide which escapes from the vessel is scrubbed using a potassium hydroxide or other basic solution such as of ammonium hydroxide. The mixture is stirred until the metals are totally dissolved. The temperature of the solution increases as the metals dissolve, but is preferably controlled to a maximum temperature of about 150° C.

The next step in the catalyst process is precipitation of a catalyst precursor from the nitrate solution using ammonium hydroxide. Ammonium hydroxide is prepared by dissolving anhydrous ammonia in water. Ammonium hydroxide at ambient temperature is added to the hot nitrate solution until the pH of the solution reaches 7.4. At this point, all of the metals have precipitated out as oxides. The mixture is cooled to 80° F. and the final pH is adjusted to 7.2.

After precipitation, the catalyst precursor must be washed free of ammonium nitrate using high quality water which is free of chlorine. The slurry is first pumped from the precipitation vessel into a holding tank located upstream of a vacuum drum filter. The catalyst precursor is allowed to settle in the holding tank, and a clear layer of concentrated ammonium nitrate solution forms above the solids. This layer is drawn off, such as by decantation or by centrifugation before the slurry is washed and filtered. A vacuum drum filter fitted with water spray bars is used for washing the catalyst precursor and concentrating the slurry. The electrical conductivity of the filtrate is monitored to ensure complete removal of ammonium nitrate from the slurry.

After the catalyst precursor has been washed, the last ingredient of the catalyst, potassium carbonate, is added in an amount appropriate for the quantity of iron contained in the batch. The potassium carbonate is dissolved in a small amount of water and this solution is mixed thoroughly into the slurry to distribute the potassium uniformly. At this point, catalyst present in the slurry should preferably be between about 8 to about 12% by weight.

Heat, such as from a spray dryer, is used to remove most of the water from the catalyst and at the same time to produce roughly spherical catalyst particles having diameters in the range of about 1 to about 5 up to about 40 to about 50 microns.

The last step in the process is annealing by heating the catalyst in air to about 600° F. to remove residual moisture and to stabilize the catalyst. Chemically, the annealing step converts the hydrous iron oxide Goethit $Fe_2O_3 \cdot H_2O$, to Hematite, $Fe_2O_3$. This step is carried out in a fluidized bed which can be electrically heated. The annealed catalyst is then ready for induction or activation and use.

Determining the "best" activating procedure for a catalyst is difficult at best even if it is known what changes in the catalyst are needed to give the desired activity, selectivity and stability. Many different activating procedures for making promoted Fischer Tropsch iron catalysts have been described in the literature. For example, one of the most definitive studies on activating Fischer Tropsch iron catalysts for use in fixed-bed reactors was published by Pichler and Merkel. (United States Department of Interior Bureau of Mines, Technical Paper 718, By H. Pickler and H. Merkel, Translated by Ruth Brinkley with Preface and Foreword by L. J. E. Hofer, United States Government Printing Office, Washington, D.C., 1949, Chemical and Thermomagnetic Studies on Iron Catalysts For Synthesis of Hydrocarbons). In this study, high activity of the catalyst was correlated with the presence of iron carbides after the activation procedure. The most effective procedure used carbon monoxide at 325° C. at 0.1 atm. pressure. The study also showed how the presence of copper and potassium in the catalyst affected activation of the catalyst.

The following equations show the stoichiometry for some of the reactions which can take place during activation:

Production of Cementite from Hematite using hydrogen-rich synthesis gas:

$$3Fe_2O_3 + 11H_2 + 2CO \rightarrow 2Fe_3C + 11H_2O \qquad (6)$$

Production of Cementite from Hematite using carbon monoxide alone:

$$3Fe_2O_3 + 13CO \rightarrow 2Fe_3C + 11CO_2 \qquad (7)$$

In the presence of an iron-based catalyst, the following reactions take place:

$$2nH_2 + nCO \rightarrow C_nH_{2n} + nH_2O \text{ (olefin)} \qquad (8)$$

and $$\frac{2n+1}{n} H_2 + CO \rightarrow \frac{1}{n} C_nH_{2n+2} + H_2O \text{(paraffins)} \qquad (9)$$

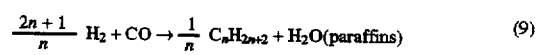

Water gas shift reaction:

$$H_2O + CO \rightleftharpoons H_2 + CO_2 \qquad (10)$$

One problem with using carbon monoxide or carbon monoxide-rich synthesis gas for activation is the possibility of over-carbonizing the catalyst whereby free carbon or non-carbidic carbon is produced thereby reducing the activity of the catalyst.

It is important in commercial plants using slurry phase Fischer-Tropsch reactors that there be flexibility in the activation procedure during start-up of the plant. For example, when the wax or Fischer-Tropsch diesel fuel and catalyst are loaded into the slurry reactor, it is necessary to have a fluidizing gas (preferably nitrogen or carbon dioxide) flowing through the gas distributor to prevent catalyst settling. Also during heating of the slurry to activation temperature, gas flow must be maintained. It may be advantageous to use synthesis gas during start-up since it is being flared and because inert gas (nitrogen or carbon dioxide) may be difficult or expensive to obtain.

By the present invention it has been discovered that an effective means for activating the iron-based Fischer-Tropsch catalyst is to heat the reactor to about 500° F. using carbon dioxide or other inert gas at a reactor pressure of about 150 psia and a temperature of about 400° F. (200° C.). At this point the carbon dioxide is replaced by synthesis gas having a hydrogen to carbon monoxide ratio of between 0.6:1 and 2.5:1, and preferably for about 90% conversion about 1:1, and most preferably above about 1.3:1. The synthesis gas flowrate is adjusted to give a space velocity (standard cubic feet per hour of synthesis gas divided by the cubic feet of expanded bed volume) of about 240 per hour. The space velocity can also be expressed in normal liters or standard cubic feet per gram or pound of promoted iron catalyst per hour. Heating of the reactor is continued while the temperature increases to 540° F. or until the heat generated by the reaction causes an increase in temperature rise rate greater than that from external heating alone. At this point, the external heating is stopped and cooling of the reactor is started to maintain the reaction temperature near 540° F. Activation is considered complete when the carbon monoxide conversion reaches about 90%.

At this point, the reactor temperature is lowered to an operating temperature preferably in the range of 450 to 525 degrees F. Also the reactor pressure can be raised to an operating level preferably below about 450 psig. The flow-rate should then be adjusted to provide a space velocity in the range of 240 to 300 per hour.

It has therefore been discovered that the activity and selectivity of a Fischer Tropsch iron catalyst is improved if the catalyst is subjected to a hydrogen-rich synthesis gas at elevated temperature and elevated pressure. The carbiding reaction of the iron catalyst precursor, principally Hematite, using a hydrogen-rich synthesis gas and the subsequent Fischer Tropsch reaction both produce water. It is believed that the presence of this water prevents over-carburization of the catalyst and thereby improves the activity and selectivity of the catalyst. (See "The Influence of Water and of Alkali Promotor on the Carbon Number Distribution of Fischer-Tropsch Products Formed over Iron Catalysts" by L. Konig et al., Ber. Bunsenges. Phys. Chem. 91, 116–121 (1987)—c VHC Verlagsgesellschaft mbH, D-6940 Weinheim, 1987.)

It has also been discovered that this hydrogen-rich synthesis gas can be used in lieu of an inert gas for maintaining the catalyst in suspension while the slurry is being heated to approximately 200° C. At this point, the synthesis gas is replaced by an inert gas (nitrogen or carbon dioxide) until the activation temperature has been attained at which time activation is carried out using synthesis gas.

It has also been discovered that the presence of a large amount (20%) by volume of nitrogen in the synthesis gas used for pretreatment of the catalyst has no detrimental effect on the activation procedure. The time for activation of the catalyst remained at two hours in the presence of 20% nitrogen.

The initial load of catalyst in a commercial-scale slurry reactor comprising several thousand pounds of catalyst is best pretreated in the full-scale slurry reactor. However, during operation, when only a few hundred pounds of catalyst need to be pretreated to replace a portion of the inventory in the reactor to maintain activity, a separate pretreatment reactor can be employed. The pretreatment reactor should be similar in design to the large Fischer-Tropsch reactor, but much smaller. The batch of slurry containing the pretreated catalyst can then be pumped into the large reactor.

EXAMPLE 1

Activation Procedure According to the Present Invention $H_2:CO=1.4$
$P=150$ psig
$T=280°$ C. (530° F.)
$SV=4$ NL/g Fe/h (240/hr or 64 SCF/16# Fe/hr)
Preheat slurry to 200° C. (392° F.) using synthesis gas.
Heat from 200° C. (392° F.) to 280° C. (536° F.) using $CO_2$ or other inert gas.
Activate using synthesis gas until the carbon monoxide conversion has reached 90%. This should occur in about two hours.

Many different Fischer-Tropsch reactor designs can be employed in the process of the present invention. The preferred design is similar to that described in the article entitled *Fischer-Tropsch Synthesis in Slurry Phase* by M. D. Schlesinger, J. H. Crowell, Max Leva and H. H. Storch in ENGINEERING AND PROCESS DEVELOPMENT, Vol. 43, No. 6 (June, 1951) pp. 1474–1479. The descriptions contained therein of a synthesis reactor utilizing a precipitated iron catalyst suspended in a cooling oil are representative of the known state of this art. Such a reactor should be sized and operated under conditions to produce up to about 90% conversion of carbon monoxide into hydrocarbon products and carbon dioxide. Preferably, the reactor used in the present process should be operated at from about 100 psia (689 kPa) to about 500 psia (3447 kPa) at a temperature in the range of from about 428° F. (220° C.) to about 536° F. (280° C.). More preferably, the pressure used should be in the range of from about 150 psia (1034 kPa) to about 300 psia (2068 kPa) at a temperature of from about 464° F. (240° C.) to about 500° F. (260° C.) and most preferably at about 225 psia (1551 kPa) and about 482° F. (250° C.). A uniform distribution of synthesis feed gas uniformly across the reactor cross section is necessary to achieve good mixing between the rising gas bubbles and the slurry medium containing the dispersed catalyst particles. The gas distributor may consist of orifices or porous metal spargers. A preferred design using orifices consists of concentric rings or torroidal manifolds nested in such a manner that the rings follow the contour of the bottom head of the reactor, i.e., the largest diameter ring at the highest elevation and the smallest ring at the lowest elevation. The orifices can be placed facing upward or downward or both. Each orifice should be placed near the center of equal areas of the reactor cross-section. The preferred porous metal sparger consists of an inner elliptical end closure at the bottom of the reactor oriented convex upward with small diameter porous plates welded into holes in the curved distributor plate. An alternate design utilizing a flat distributor plate would perhaps provide a more uniform distribution of bubbles but would require a larger thickness to resist bending. The preferred space velocity selected for optimal reactor conversion efficiency should be between 100 and 300 cubic feet per hour per cubic feet of expanded catalyst bed, more preferred between 200 and 270 cubic feet per hour per cubic feet of expanded bed, and most preferably about 240 cubic feet per hour, per cubic feet of expanded catalyst bed. The reactor diameter should be selected to give a feed superficial velocity (actual volumetric flow rate of feed gases divided by empty reactor cross-sectional area) between approximately 0.33 to 0.66 feet per second (0.1 to 0.2 meters per second). These conditions should increase the height of the selected catalyst bed between 30% and 45% over the height of the bed without flow.

The percent by weight of the foregoing iron catalyst is preferably between 5 and 15 percent by weight of iron in the slurry more preferably between 7.5 and 12.5 percent by weight and most preferably about 10% by weight of the slurry. These preferred percentages of iron in the initial mixture of wax and catalyst are selected to give a preferred concentration of iron in the expanded slurry bed under operating conditions. This preferred concentration of iron should be in the range of 30 to 90 grams of iron per liter of expanded bed volume (1.87 to 5.62 pounds of iron per cubic foot of expanded bed volume). More preferably, the concentration of iron should be between 45 and 75 grams of iron per liter of expanded slurry volume (2.81 and 4.68 pounds of iron per cubic foot of expanded slurry volume). Most preferably, the concentration of iron should be about 60 grams of iron per liter of expanded slurry volume (3.75 pounds of iron per cubic foot of expanded slurry volume).

The preferred method for removing the large exothermic heat of reaction is a heat exchanger within the slurry reactor. The bubbling action in the slurry produces an efficient heat transfer medium for transferring the heat from the slurry to the heat exchanger. The heat exchanger tubes should extend from a height about 3 feet (1 m) above the gas distributor to the top of the expanded slurry. The preferred heat transfer medium is pressurized water introduced into the bottom of the tubes via concentric torroidal manifolds. The water undergoes boiling in the tubes which provides a large heat transfer coefficient. The efficient heat transfer from the slurry to the boiling water allows the slurry temperature to be nearly uniform throughout the reactor. The temperature of the slurry can be controlled by a combination of the height of water in the tubes and the steam pressure (and therefore steam saturation temperature) in the tubes.

Under the preferred operating conditions described herein, the iron catalyst particle size selected should have a large dimension of preferably between about 1 to 5μ to 40 to 60μ, more preferably 10μ to 40μ and most preferably about 30μ.

It is expected that any of the catalysts which favor reaction (5) can be used effectively in the present invention. Preferably, the iron based catalysts described hereinbefore are utilized due to their low cost. Most preferably, a precipitated iron catalyst is employed and depending on the preselected alpha, i.e., the polymerization probability (chain growth) desired; where the weight ratio of potassium (as carbonate) to iron is between 0.005 and 0.015, more preferably between 0.0075 and 0.0125, and most preferably about 0.010. Larger amounts of alkali metal promoter cause the product distribution to shift toward the longer-chain molecules, while small amounts of alkali metal result in predominantly gaseous hydrocarbon product. The weight ratio of copper to iron is preferably between about 0.005 and 0.050, more preferably between about 0.0075 and 0.0125, and most preferably about 0.010. Copper serves as an induction promoter. The foregoing ranges are utilized to obtain the high conversion efficiencies hereinafter described in the Fischer-Tropsch slurry reactor, the product distribution obtained and the relatively long life of the catalyst.

Figure 5A:
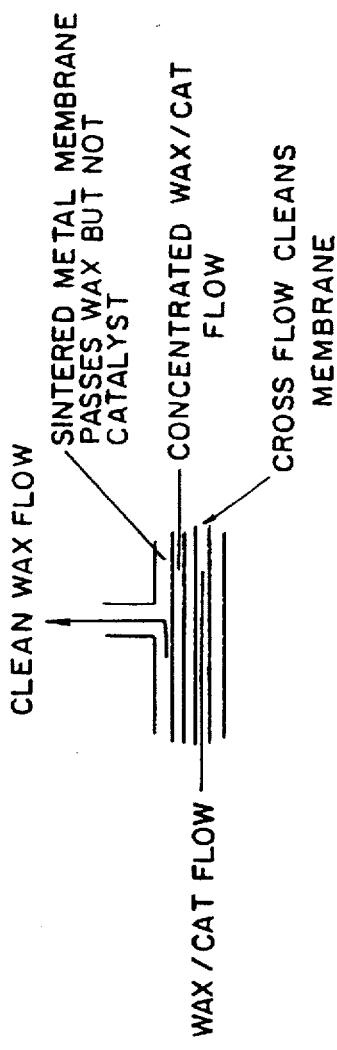
FIG. 5(a) is a cross section schematic enlargement.
Figure 5:
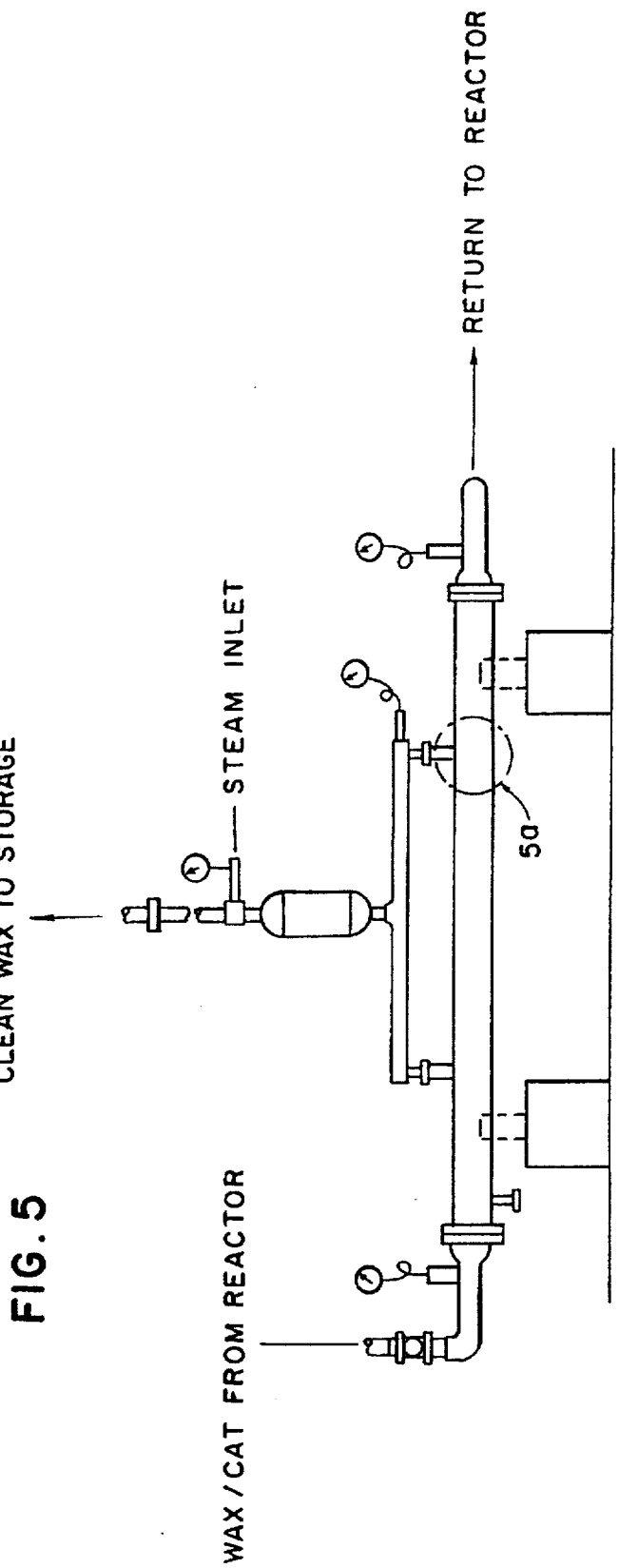
FIG. 5 is a side view illustration of a cross-flow filter used for wax clean up in the present invention.

Referring now to FIG. 1, one of the characteristics of a Fischer-Tropsch slurry reactor designed to produce heavier hydrocarbon products, is the continuous increase in slurry height due to the low volatility of the heavier waxes. One means to maintain the slurry level to a constant value is to use a cross-flow filter 27 (shown in FIG. 1) to remove filtered wax, stream 28, while returning the catalyst to the reactor through stream 29. The advantage of the cross flow filter is that a flow velocity of the slurry through the porous filter tubes of about 10 feet per second (3 M/S) will slow down the building rate of a catalyst layer on the tube wall. When the flow rate of filtered wax through the porous tubes has diminished to a predetermined level, an inert gas such as carbon dioxide is used to pressurize the filtered wax on the shell side of the cross flow filter to bump the layer of catalyst into the slurry stream 29, which flows back into the Fischer-Tropsch reactor 15. As an example of the flowrates involved for a commercially available cross-flow filter from Mott Metallurgical Corporation (Farmington, Conn.) if the rate of removal of filtered wax through the tubes is 2 gpm, then the slurry flowrate from the Fischer-Tropsch reactor 15 to the cross-flow filter 27 would be 65 gpm and the flowrate of slurry back to the Fischer-Tropsch reactor would be 63 gpm in order to provide a velocity of 10 fps in the porous tubes to give the required shearing action to prevent catalyst buildup. A schematic diagram of a Mott cross flow filter and installation are shown in FIG. 5.

Figure 6:
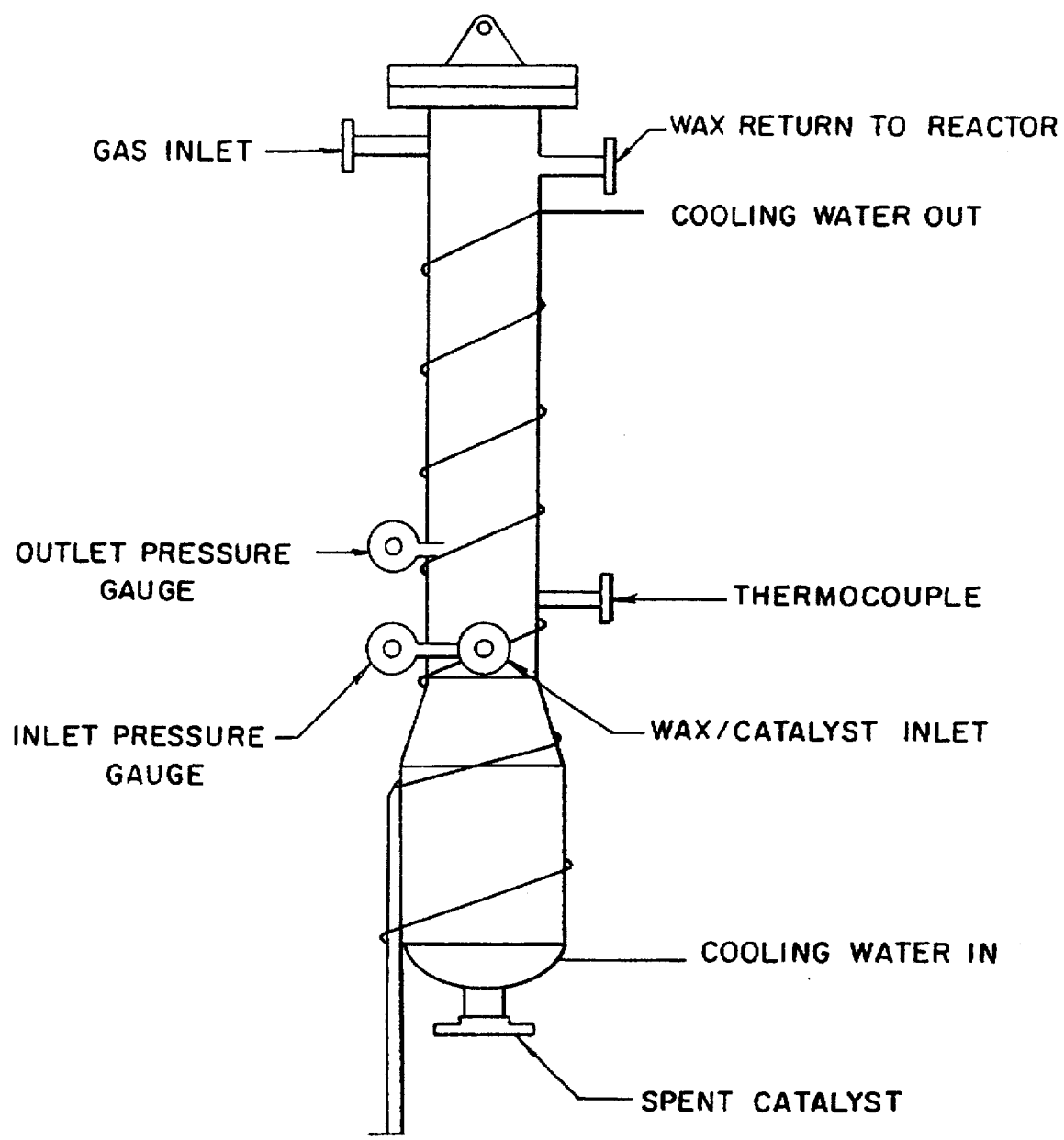
FIG. 6 is an illustration of a catalyst filter apparatus useful in the practice of the present invention.
Figure 6A:
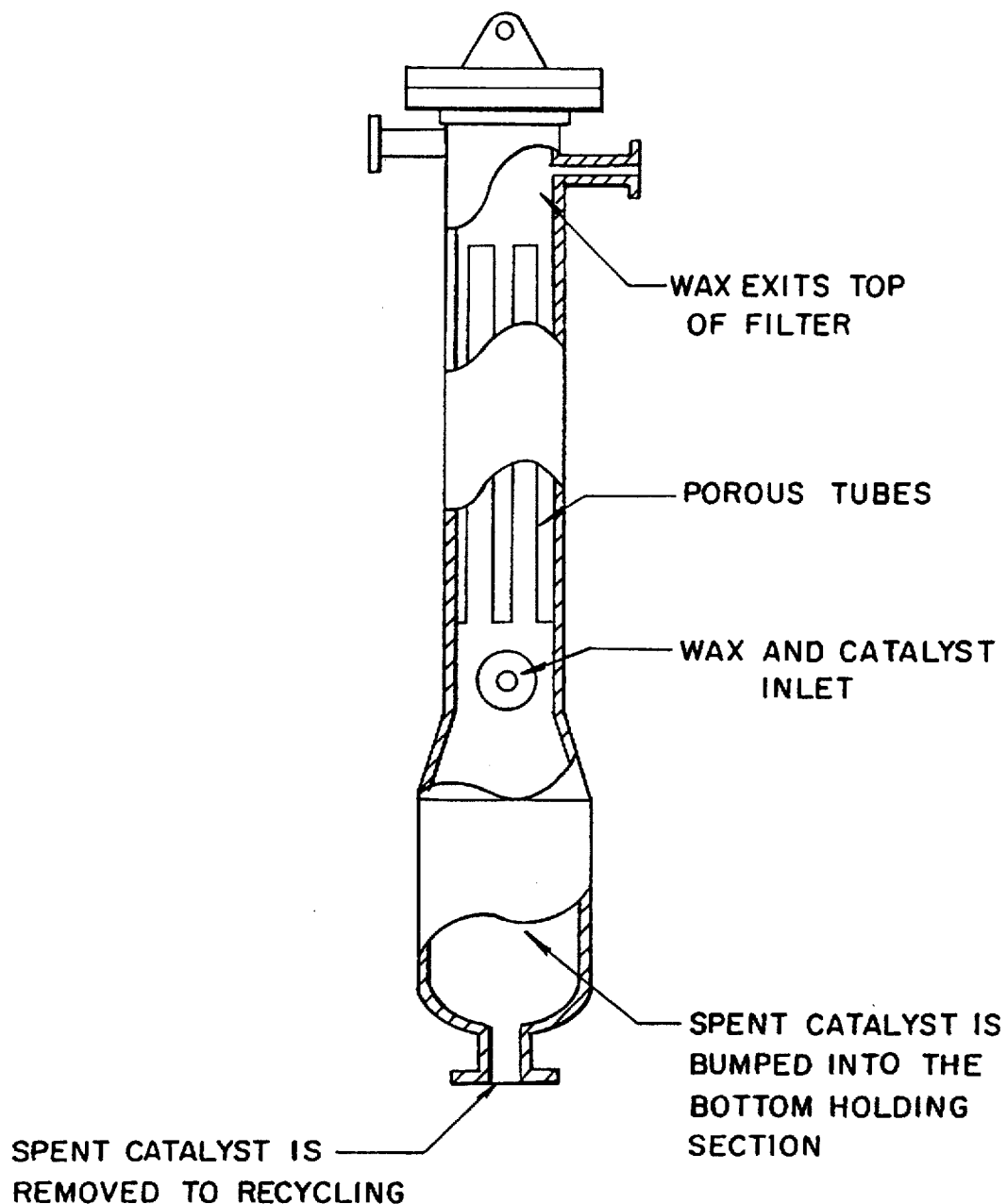
FIG. 6(a) is a partial cross section view.
Figure 7:
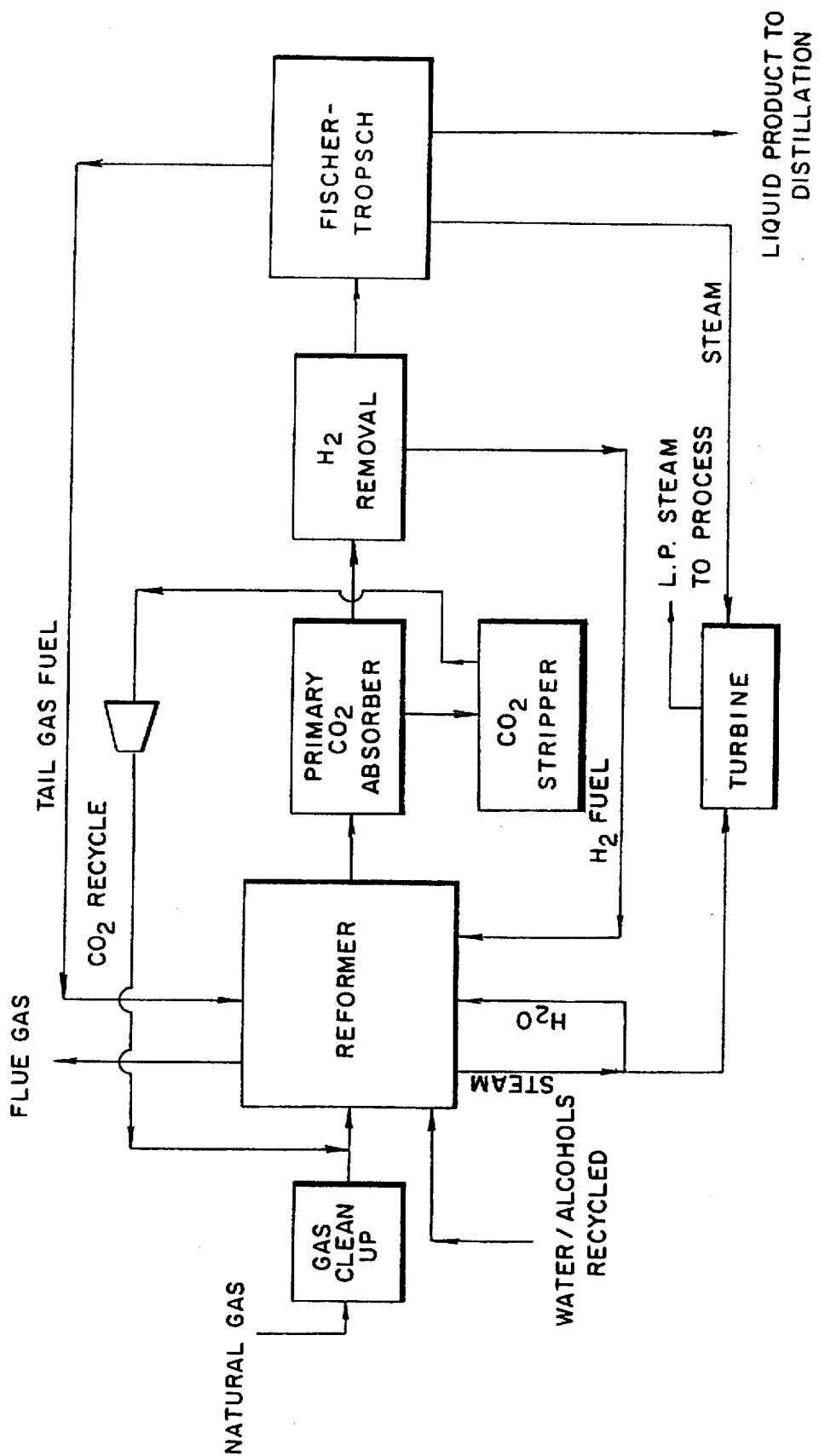
FIG. 7 is a schematic showing a process according to the present invention employing steam reforming with no tail gas recycle and one carbon dioxide absorber.
Figure 8:
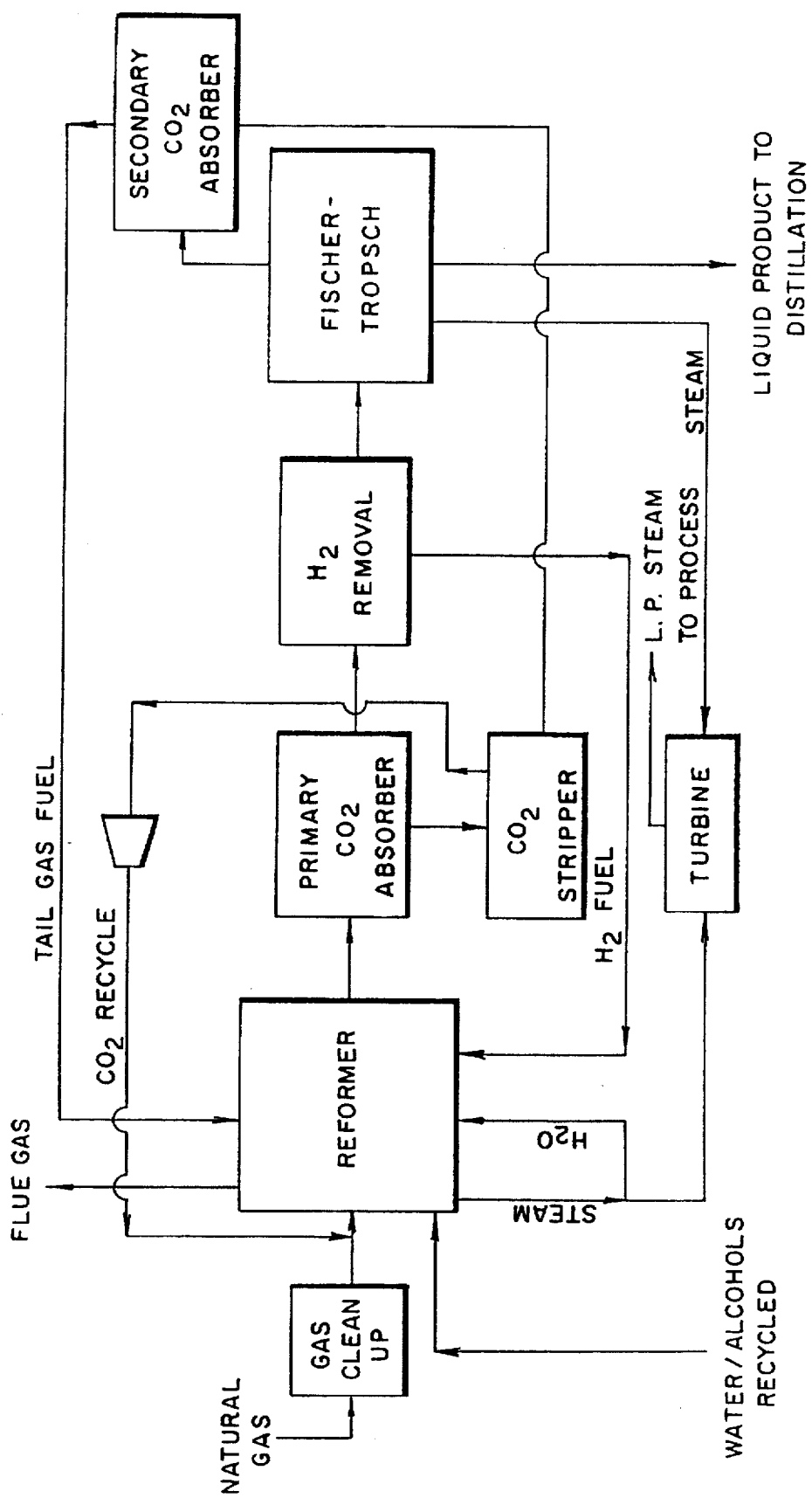
FIG. 8 is a schematic showing a process according to the present invention employing steam reforming with no tail gas recycle and two carbon dioxide absorbers.
Figure 9:
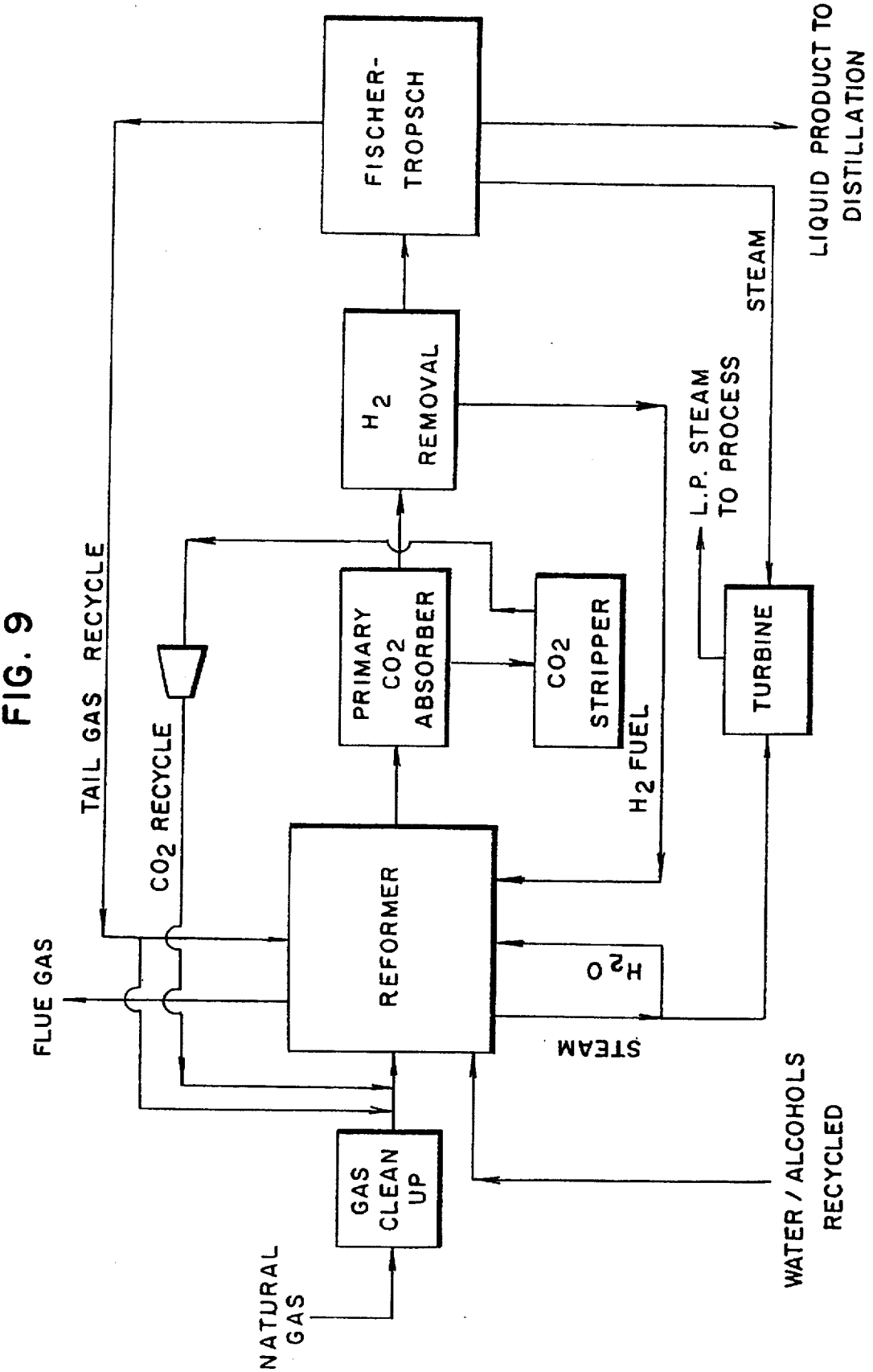
FIG. 9 is a schematic showing a process according to the present invention employing steam reforming with tail gas recycle with one carbon dioxide absorber.
Figure 10:
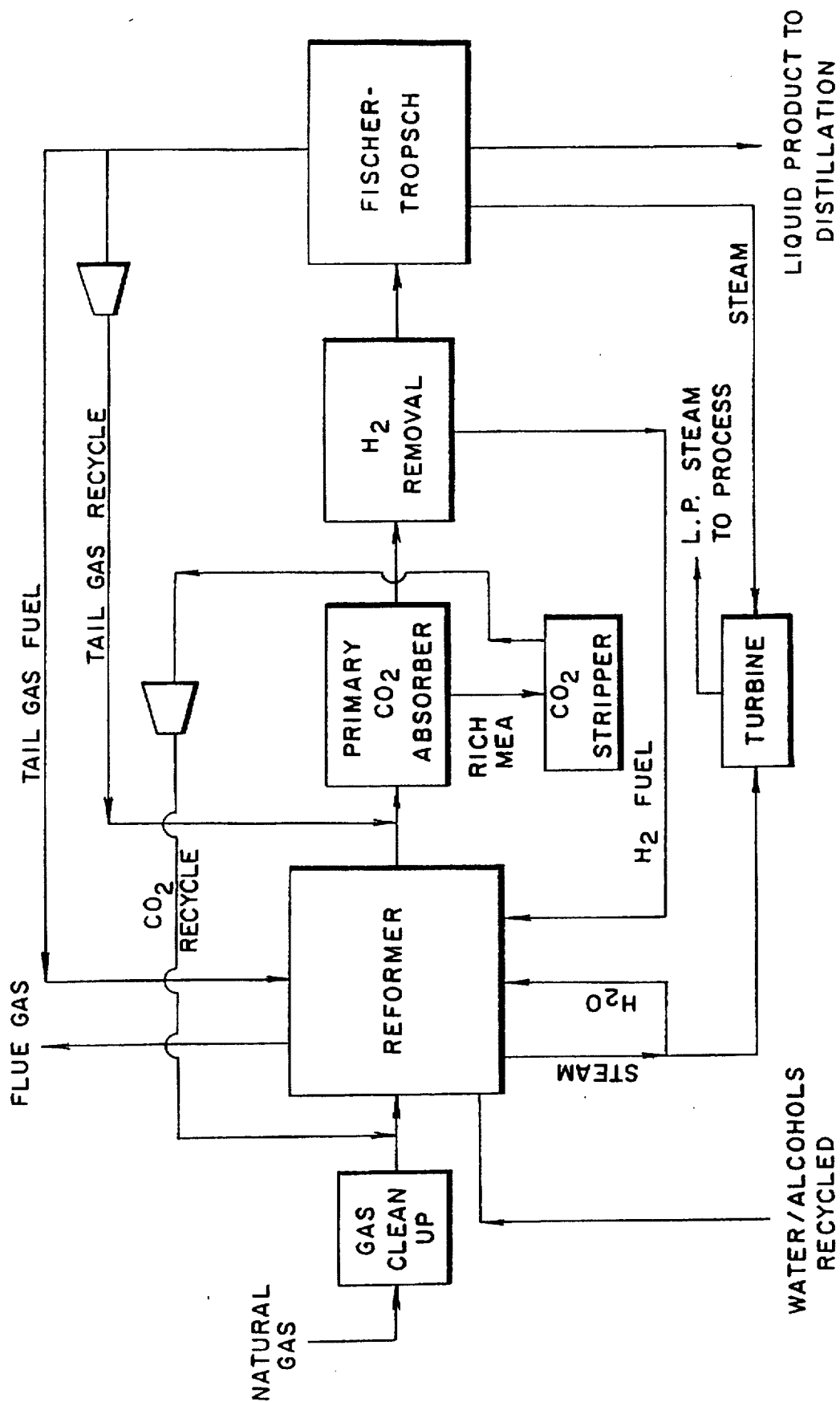
FIG. 10 is a schematic showing a process according to the present invention employing steam reforming with tail gas recycle with one carbon dioxide absorbers.
Figure 11:
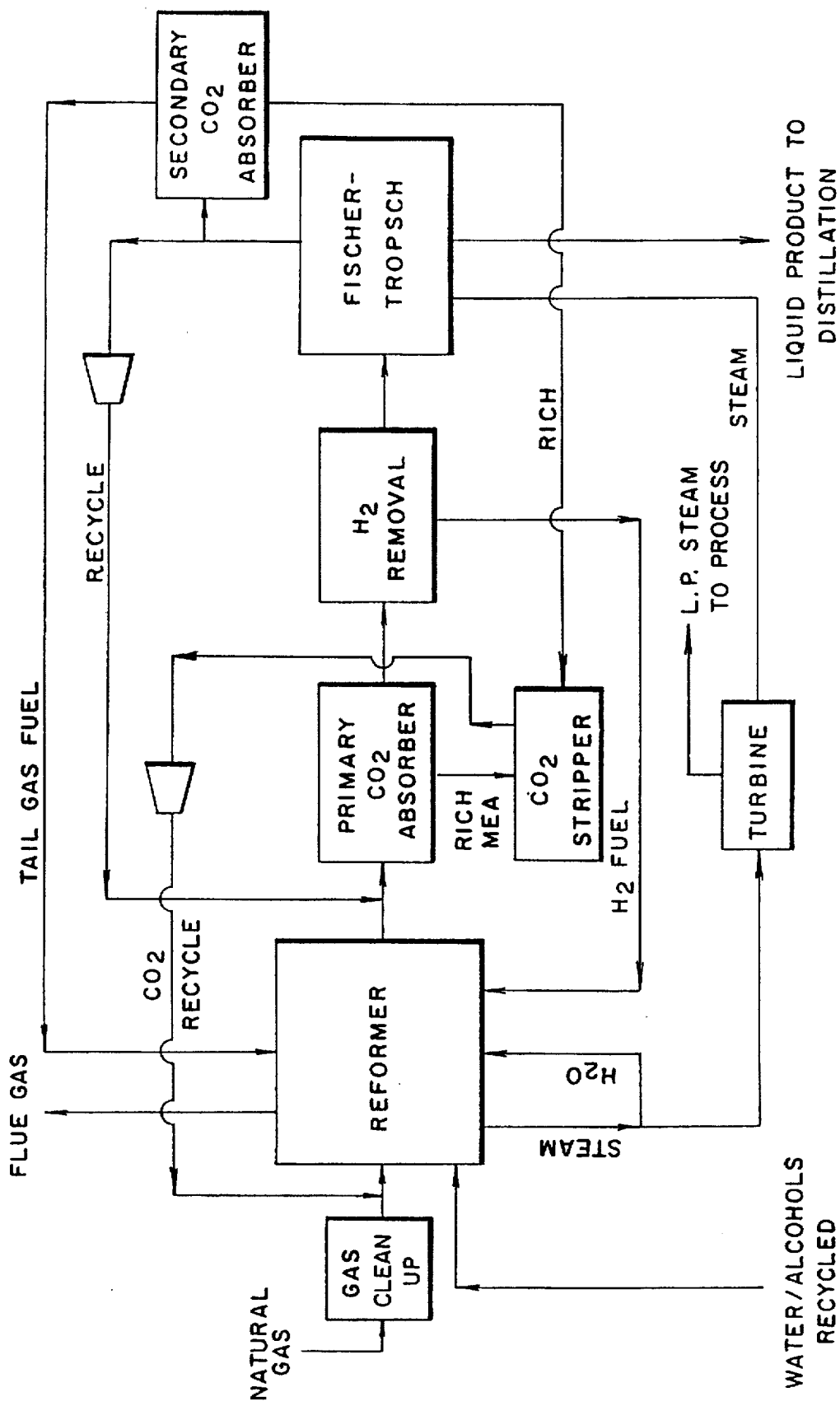
FIG. 11 is a schematic showing a process according to the present invention employing steam reforming with tail gas recycle with two carbon dioxide absorbers.
Figure 12:
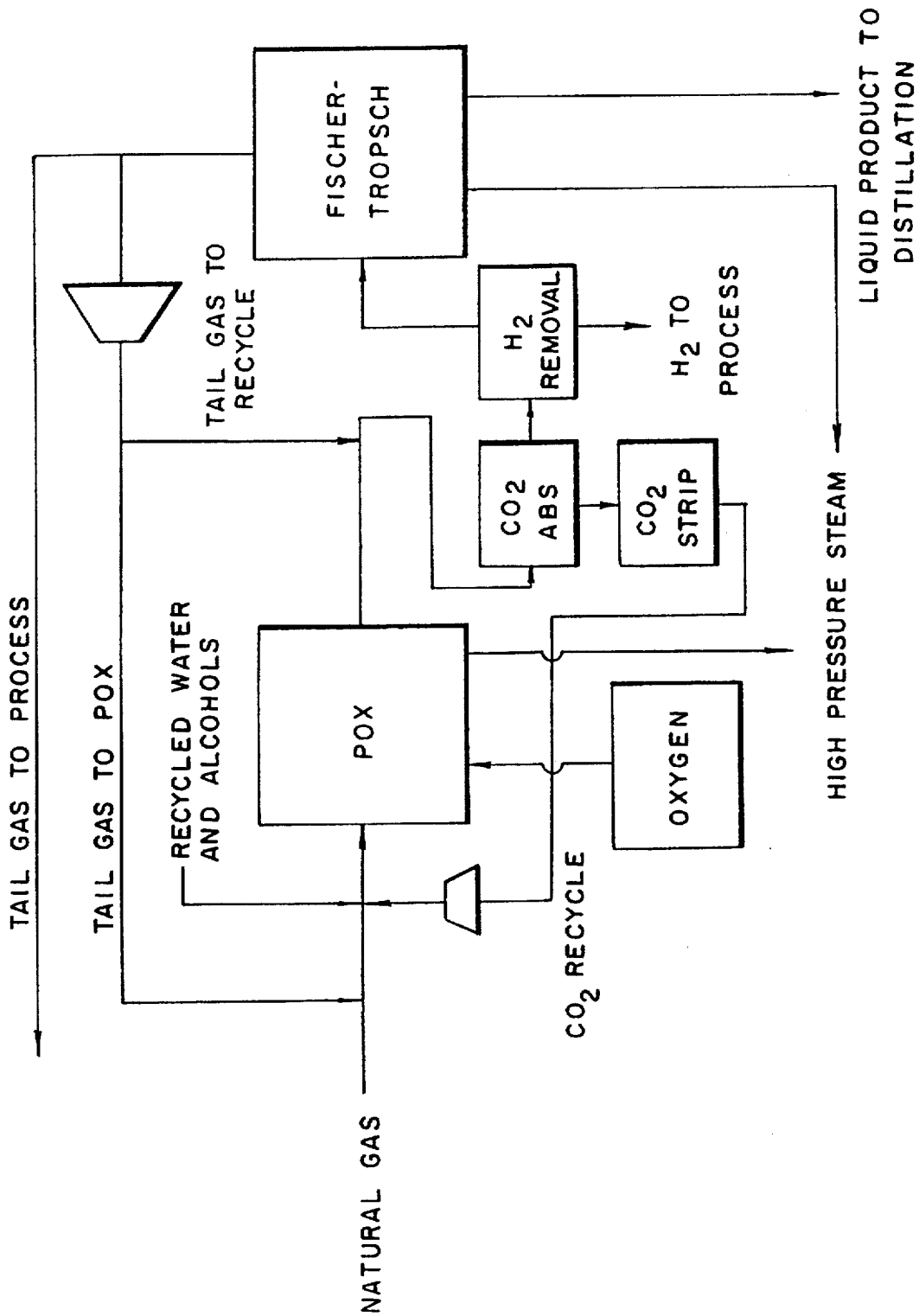
FIG. 12 is a schematic showing a process according to the present invention employing partial oxidation with hydrogen removal and optionally carbon dioxide removal.

In order to periodically remove catalyst from the reactor, a slipstream of slurry, 30, is fed to another porous metal filter which collects catalyst on the inside of the porous tubes, the catalyst is periodically "bumped" into the bottom holding section using an inert gas. A schematic diagram of a Mott filter which can be used for catalyst removal is shown in FIG. 6.

The separation stage 18, (FIG. 1) of the process can be configured in different ways to recover the different products and product distributions resulting from different gaseous hydrocarbon feeds, reaction conditions and catalysts.

In the preferred embodiments described hereinafter, the separation stage 18 can employ a cold trap, and/or distillation apparatus. In this manner, the gases in stream 20 including carbon dioxide, can be recycled, via stream 19, and/or a portion of the gases can be used as a fuel stream 25 or feed stock stream 17 for the steam reforming stage 5.

Utilizing the reaction conditions described, the light hydrocarbon gases and carbon dioxide are separated and the higher carbon-containing products are separated from the pre-separation product stream 16. Advantageously, the gaseous product stream 20 after separation, is rich in light hydrocarbons and can be used directly for process heat. The product stream 21 containing hydrocarbons having carbon contents between $C_5$–$C_{20}$, generally a mixture of saturated and unsaturated aliphatic, hydrocarbon product, can be employed as a substitute for diesel fuel and the like. It has been determined that high cetane numbers are obtained from this product stream, which makes it particularly attractive either alone or blended with other diesel fuel stocks. Engine tests on the diesel fraction on the present invention, typically containing $C_{11}$–$C_{19}$ have demonstrated that diesel fuel made with it burns much cleaner than commercially available diesel derived from crude oil. In addition, the particulate emissions are much lower than those produced with conventional diesel fuels partly because the aromatic content is less than about 1% by weight compared to about 32% by weight for conventional diesel fuels.

The physical characteristics of the diesel product produced by the present process are compared with the specifications for ASTM diesel grades, shown in Tables I–V.

Finally, product stream 22 is rich in hydrocarbon products containing more than twenty carbon atoms, and generally useful as paraffin wax.

TABLE I

|  | No. 1 Diesel ASTM(1) | No. 2 Diesel ASTM(2) | F/T Diesel |
|---|---|---|---|
| Cetane Index ASTM 976-80 | 45 min | 40 min | 62 |
| Sulfur wt. % ASTM D129-80 | .50 max | .50 max | <0.0001* |
| 90% Distillation | 550° F.-max | 540° F.-min | 556° F. |

TABLE I-continued

|  | No. 1 Diesel ASTM(1) | No. 2 Diesel ASTM(2) | F/T Diesel |
|---|---|---|---|
| Temperature °F. ASTM D56 |  | 640° F.-max |  |
| Viscosity @ 40° C. cSt. ASTM D445-82 | 1.4 min 2.5 max | 1.9 min. 4.1 max | 1.8 |
| Conradson Carbon on 10%; ASTM D189-81 wt. % | .15 max | .35 max | .02 |
| Flash Point °F., min Corrected to 760 mm Hg ASTM D56-82 | 100° F. | 125° F. | 122° F. |
| Aromatic Content, Vol. %; ASTM D1319 | 8% min | 33% | less than 1% |
| API Gravity ASTM D1298 | 38–41 | 34.7 | 48.7 |
| BTU/lb ASTM D240 | 16,000–17,000 | 19,810 | 19,371 |
| Oxygen Content, wt % | N/A | N/A | 3.05% |

*Analyses were below limits of detection.
(1) ASTM D975-81 #1 Diesel
(2) ASTM D975-81 #2 Diesel The following is a more detailed analysis of the diesel of Table I.

TABLE II

| TEST | METHOD | RESULTS |  |
|---|---|---|---|
| Flash Point °F. | ASTM D56 | 122 |  |
| API Gravity @ 6° F. | ASTM D1298 | 48.7 |  |
| Sulfur Content, wt. % | Horiba Analyzer | <0.0001 |  |
| Kinematic Viscosity @ 40° C., cSt. | ASTM D445-82 | 1.80 |  |
| Distillation Range | ASTM D86 | IBP | 314 |
|  |  | 90% | 566 |
|  |  | FBP | 627 |
| Conradson Carbon on 10% Residuum, wt. % | ASTM D189-80 | 0.02 |  |
| Saturates, wt. % | NMR/90 MHz | 30 |  |
| Alpha-Olefins |  | 45 |  |
| Internal-Olefins |  | 9 |  |
| Alcohols and Other |  | 16 |  |
| Oxygen Content, wt. % | Elemental Analysis | 3.05 |  |
| Average Carbon Chain Length | GC/FID | $C_{14}$ |  |
| Cetane Index | ASTM D976 | 62 |  |
| Heat of Combustion, BTU/lb. | ASTM D240 | 19,371 |  |

In addition to the foregoing, the F/T Diesel of the present invention was further analyzed.

TEST RESULTS

Relative percent (approximate) alcohols by Gas Chromatography/Mass Spectroscopy for the specific species of alcohols present.

| Alcohol | Percent (approx.) |
|---|---|
| Propanol | 0.02 |
| Butanol | 0.1 |
| Pentanol | 0.3 |
| 3-Methyl Pentanol | 0.3 |
| Hexanol | 0.1 |
| Octanol | 0.9 |
| Decanol | 1.0 |
| Dodecanol | 0.9 |
| Tetradecanol | 1.0 |
| Pentadecanol | 0.9 |
| Hexadecanol | 0.7 |
| Heptadeacanol | 0.2 |
| Octadecanol | 0.6 |
| Nonadecanol | 0.1 |
| Other Branched Alcohols | 1.0 |
| Total Alcohols | 8–9 |

While the contribution of the presence of alcohols to the superior performance of the F/T diesel with respect to emissions generally and particulate airborne emissions more specifically is not fully understood at the present time, the following analysis clearly shows the superior performance of the F/T diesel fuel of the present invention.

TABLE III

SYNTHETIC DIESEL FUEL

| ASTM Distillation, °F. |  |
|---|---|
| IBP | 332 |
| 90% | 514 |
| EP | 555 |
| Cetane Index | 62 |
| Sulfur Content, wt % | <.001 |
| Cloud Point, °F. | -2 |
| Pour Point, °F. | -6 |
| Conradson Carbon on 10% Residuum, wt % | .05 |
| Flash Point, °F. | 146 |
| Bottom Sediment & Water, vol. % | <.025 |
| Kinematic Viscosity @ 100 °F., cSt | 1.89 |
| API Gravity @ 60°F. | 48.5 |
| Aromatics, wt % | less than 1% |
| Paraffins, wt % | 47 |
| Olefins, wt % | 41 |
| Alcohols, wt % | 6 |
| Other oxygenates, wt % | 6 |
| Heat of Combustion, Btu/lb | 18,585 |
| Heat of Combustion, Btu/gal | 128,230 |

TABLE IV

EMISSION RESULTS (g/bhp-hr)

|  | HC | CO | NOx | BSP |
|---|---|---|---|---|
| #1 DIESEL FUEL | .81 | 1.25 | 4.89 | .326 |
| std. dev. | .01 | .02 | .02 | .001 |
| SYNTHETIC FUEL | .69 | 1.08 | 5.19 | .268 |
| std. dev. | .01 | .00 | .02 | .008 |

CLEAN AIR ACT AMENDMENTS OF 1990 U.S.
HEAVY DUTY TRUCK ENGINE EMISSION
STANDARDS—g/bhp-hr

|  | 1990 | 1991 | 1994 | 1996 |
|---|---|---|---|---|
| HC | 1.3 | 1.3 | 1.3 | 1.3 |
| CO | 15.5 | 15.5 | 15.5 | 15.5 |
| NOx | 6.0 | 5.0 | 5.0 | 4.0 |
| PARTICULATE | 0.6 | 0.25 | 0.10 | 0.10 |

From the data shown and by comparison to the standards in the Clean Air Act Amendments of 1990 there is a significant reduction in unwanted airborne emissions when using the synthetic fuel F/T diesel of the present invention as compared to commerically available product.

The enhanced emission performance strongly suggests that an oxygen containing additive produces improved performance. The synthesis process of the present invention produces not only synthetic F/T diesel containing oxygenates but also a naphtha that contains several oxygen containing specie including alcohols. The following analysis shows some of the typical chemical and physical characteristics of the naphtha produced by the process of the present invention.

TABLE V

| TEST | METHOD | | RESULT |
|---|---|---|---|
| API Gravity @ 60°F. | ASTM D1298 | | 54.7 |
| Distillation Range | ASTM D86 | IBP | 230° F. |
| | | FBP | 300° F. |
| Saturates, wt. % | NMR/MHz | | 22 |
| Alpha-Olefins | | | 48 |
| Internal-Olefins | | | 0 |
| Alcohols | | | 26 |
| Water | | | 4 |
| Oxygen content | | | 7.35% |
| Average Carbon Chain Length | GC/FID | | $C_8$ |

| Alcohol Content, Rel. Percent (approx.) | |
|---|---|
| Octanol | 4.5 |
| Nonanol | 7.4 |
| Decanol | 5.2 |
| Dodecanol | 0.9 |
| 3-Methyl-1-Butanol | 4.4 |
| 3-Methyl-1-Pentanol | 0.8 |
| Hexanol | 3.7 |
| Heptanol | 2.3 |
| 1-Nonanol | 0.6 |
| Total Alcohols | 30 |

It has been learned that the addition of a sufficient amount of the synthetic naphtha from the process of the present invention to produce an oxygen content of 2% or more by weight of conventional diesel fuel provides a significant reduction in the emissions produced in standard engine tests.

Such an addition must be judiciously made to provide the higher oxygen levels in the fuel without significantly changing the other specification parameters causing them to exceed the permissible ranges specified for the suitability of the fuel for its intended function.

The wax product can either be used as produced cracked by heating to produce additional synthetic diesel fuel and naphtha.

Depending on the desired end product, where a wax is desired, a wax clean up step is contemplated to remove any entrained catalyst which is smaller than the pore size of the porous metal filter element (0.2μ to 0.5μ) in the cross flow filter, 27.

Where additional diesel fuel is desired, the wax can be heated to 410° C. (770° F.) to produce additional naphtha and diesel fuel. The following are typical analysis of the results of a wax thermal cracking step as described. Other conventional procedures may be employed.

It will be seen in the following Tables VI and VII that the level of oxygen contained in the diesel and naphtha produced from a wax cracking step is quite low and may be adjusted if desired for the results described by blending with either the oxygen containing naphtha the oxygen-containing diesel fuel from the process.

TABLE VI

| DIESEL CRACKED PRODUCT | | | |
|---|---|---|---|
| TEST | METHOD | | RESULTS |
| Flash Point °F. | ASTM D56 | | 138 |
| API Gravity @ 60° F. | ASTM D1298 | | 47.5 |
| Sulfur content, wt. % | Horiba Analyzer | | <0.0001 |
| Kinematic viscosity @ 40° C., cSt. | ASTM D445 | | 2.49 |
| Distillation Range | ASTM D86 | IBP | 348 |
| | | 90% | 653 |
| | | FBP | 694 |
| Conradson Carbon on 10% Residuum, wt. % | ASTM D189 | | <0.01 |
| Saturates, wt. % | NMR/90 MHz | | 46 |
| Alpha-Olefins | | | 46 |
| Internal-Olefins | | | 8 |
| Oxygen Content, wt. % | Elemental Analysis | | 0.16 |
| Average Carbon Chain Length | GC/FID | | $C_{15}$ |
| Cetane Index | ASTM D976 | | 73 |
| Heat of combustion, BTU/lb. | ASTM D240 | | 19,754 |

TABLE VII

| NAPHTHA | | |
|---|---|---|
| TEST | METHOD | RESULTS |
| Saturates, wt. % | NMR/MHz | 40 |
| Alpha-Olefins | | 52 |
| Internal-Olefins | | 7 |
| Alcohols | | 0 |
| Average Carbon Chain Length | GC/FID | $C_8$ |

One salient feature of this invention, previously described, resides in the use of carbon dioxide in the steam reformer, or other reactor for producing hydrogen and carbon monoxide in order to improve the overall carbon conversion efficiency of the process when the source of the carbon dioxide is partially derived from the Fischer-Tropsch reaction.

The gas stream 19, containing light hydrocarbon gases and carbon dioxide is subjected to similar carbon dioxide removal by absorption and subsequent stripping as previously described and shown generally at 8. Preferably, the separated carbon dioxide from the steam reforming and the Fischer-Tropsch reactors, stream 9, is then added to the incoming gas stream 6 into the steam reforming reactor 5 to achieve the proportions previously described. Excess $CO_2$ may be vented, or compressed and stored for disposition.

Light hydrocarbon gas stream, after separation from the carbon dioxide, can be recovered for use as a petrochemical feed stock or fuel, or a fuel for the steam reformer, recycled to the inlet gas stream 12 to the Fischer-Tropsch reactor to enable further chain growth of olefins and alcohols. It can even be recycled to the inlet gas stream 6 if desired, as shown by the dotted line 17, to improve overall carbon conversion efficiency and impart an adjustment in the yield of the higher hydrocarbon product stream 21.

Figure 3:
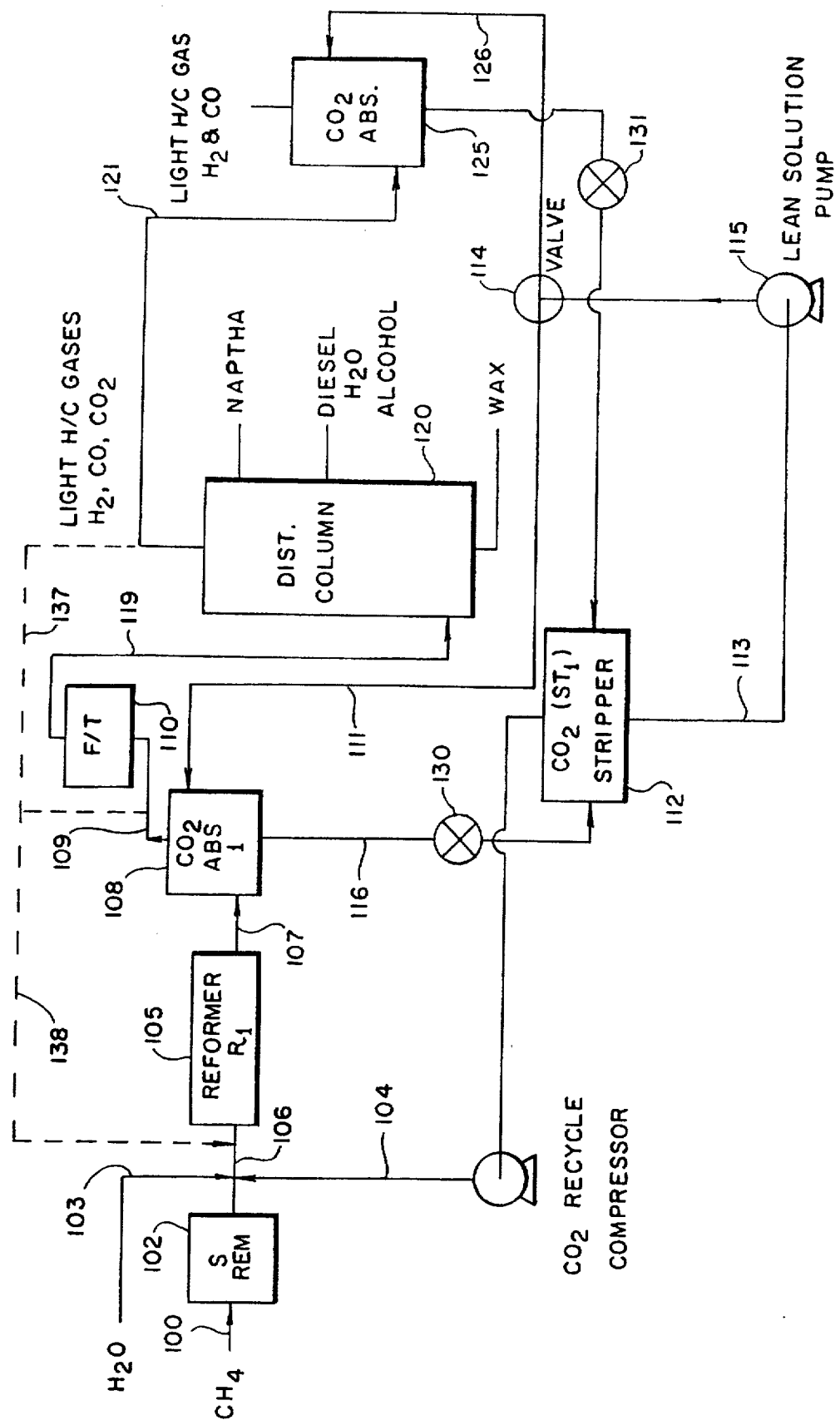
FIG. 3 is a more detailed schematic of the system of the present invention.

The preferred process system of the present invention is shown schematically in FIG. 3.

The incoming gas stream 100 is subjected to sulfur removal, if desired, at 102. The gas, after sulfur removal and after introduction of steam, in stream 106 for reaction in the steam reformer 105.

The reaction product stream 107 from the steam reformer, containing primarily hydrogen, carbon monoxide and carbon dioxide, is introduced into a carbon dioxide absorber 108. The product gases having preferably less than about 10% carbon dioxide and more preferably less than about 5% by volume of carbon dioxide is then transferred via line 109 into the Fischer-Tropsch reactor 110. Preferably the lean carbon dioxide absorbing solution previously described, is introduced by pump 115 into the absorber via line 111 after removal from the carbon dioxide stripper 112 by line 113 and valve 114. The carbon dioxide rich solution created in the absorber 108 is transferred to the stripper 112 by line 116.

After reaction in the Fischer-Tropsch reactor 110, the reaction products are transferred via line 119 to a distillation column 120 where the hydrocarbon wax products are separated from the diesel fuel, water and alcohol, naphtha and the light hydrocarbon gases, carbon dioxide, carbon monoxide and hydrogen.

The light hydrocarbon product stream is then transferred via line 121 to a carbon dioxide absorber 125 where the light hydrocarbon gases are separated from the carbon dioxide for further use and the carbon dioxide rich solution from absorber 125 flows through valve 131 absorbed carbon dioxide is stripped in the stripper 112 and then recycled to the reformer 105 via lines 130 and 104. The lean carbon dioxide absorbing solution is returned back to the carbon dioxide absorber 125 by line 113, pump 115 and line 126. Optionally, the light hydrocarbon gases, stream 137, can be recycled back to the inlet of the Fischer-Tropsch reactor in order to enable the olefins and alcohols contained therein to participate in further chain growth. In some instances, it may be desirable to combine the carbon dioxide absorber, 125, with the carbon dioxide absorber, 108, to reduce the cost and complexity of the plant. Any portion of stream 137 not recycled back to the Fischer-Tropsch reactor, stream 138, can be either used for fuel for the reformer or added to the reformer feed, 106.

The following examples were modeled using the conditions listed. The modeling is based on the experience with various conditions used in pilot plant studies and represents the expected results using the conditions employed.

Carbon conversion efficiency for the overall process is defined as the ratio of rate of production of carbon contained in the $C_5+$ product in the Fischer-Tropsch reactor divided by the rate of introduction of carbon atoms in the process feed.

The amount of $C_5+$ product produced by the Fisher-Tropsch reactor is calculated in the following manner.

A given quantity of hydrogen and carbon monoxide react to form a product stream consisting of hydrogen, carbon monoxide, carbon dioxide, water, hydrocarbons and oxygenates. Any gases other than hydrogen and carbon monoxide which enter the reaction vessel are assumed to act as diluent gases only. Determining the nature of the complete product stream involves solving for six (6) unknowns: (i) moles of hydrogen; (ii) moles of carbon monoxide; (iii) moles of carbon dioxide; (iv) moles of water; (v) moles of hydrocarbons and oxygenates; and (vi) composition of the hydrocarbons and oxygenates leaving the reaction vessel.

To solve for these six unknowns, six equations are required. The first three result from the requirement that carbon, hydrogen, and oxygen be conserved across the reactor. The fourth equation results from the assumption that a given amount, 90% of the feed carbon monoxide is reacted. The fifth equation results from empirical pilot plant data which shows that consumption of hydrogen by conversion to hydrocarbon product and water depends upon input hydrogen-to-carbon monoxide ratio and carbon monoxide consumption:

$$\frac{\text{Change in Moles of Hydrogen}}{\text{Change in Moles of Carbon Monoxide}} =$$

$$0.252 + (0.462)\left(\frac{\text{Input Moles Hydrogen}}{\text{Input Moles Carbon Monoxide}}\right)$$

The sixth equation results from a statement of the Schultz-Flory theory: the moles of hydrocarbon of carbon number n in the product stream equals the moles of hydrocarbon of carbon number n-1 multiplied by alpha, the chain growth probability which is a constant for a given catalyst system and set of operating conditions. As shown in the hereinbefore referenced article by Satterfield and Huff, the Schultz-Flory theory is valid only if all compounds of each carbon number are included.

For example, the total number of moles of compounds having two carbon atoms is alpha times the number of moles of methane and formaldehyde produced in the reaction. It has been found that in practice, two different chain-growth probabilities are required to match experimental product distributions. For example, one particular catalyst produced products that required a chain-growth probability of 0.73 for carbon numbers from 1 to 9. The two most prevalent explanations for this "dual slope" phenomenon are 1) that there exist two types of sites on the catalyst—those that are promoted and those that are not; and 2) that all sites are the same but vapor-liquid equilibria determine the residence time of the growing molecules in the reactor and hence the distribution of products.

It must be stated that the analyses based on the equations are approximations to what can be expected in actual practice. Interpreting the hydrocarbon product stream as including oxygenated compounds gives results which are valid for comparison purposes.

In Table 1, the parameters and results of analyses performed on the system for converting hydrocarbon gases described hereinbefore, operated in different modes and at different conditions and compared to other diesel fuels are reported.

EXAMPLE 2

Referring to FIG. 3 one million standard cubic feet (28,316 $\mu M^3$) per day of natural gas (assumed to be methane regulated to a pressure of 230 psia (1590 kPa)) is heated to 700° F. (371° C.) in preheater PH1 (not shown) and flows through sulfur removal bed S1 at a space velocity of 700 $M^3$ per hour per $M^3$ of catalyst. S1 is a fixed bed of commercially available zinc oxide spherical pellets ranging in diameter from ⅛ inch (3 mm) to 3/16 inch (5 mm). This type of sulfur removal process is appropriate for low levels of sulfur compounds, e.g. less than 25 parts per million (ppm).

The natural gas leaving S1 has a sulfur content less than 0.5 ppm and is mixed with 1.46 MMSCF (41,343 $M^3$) per day of carbon dioxide recycled from stripper ST1 and 1.73 MMSCF (48,987 $M^3$ per day of steam. The mixture is preheated to 1292° F. (700° C.) in a preheater (not shown) by the gases leaving the reforming reactor R1. The heated gas mixture undergoes chemical reaction in the catalytic reforming reactor R1. The catalyst is a commercial reforming catalyst such as nickel supported on aluminum oxide in the form of raschig rings (e.g. catalyst 23-1 available from Katalco). Since the chemical reactions taking place involving the methane, steam and carbon dioxide are endothermic, heat is supplied to the outside walls of the tubes containing the catalyst rings. Due to heat transfer limitations, tube diameters are kept small, e.g. 5 inches (12.7) cm) and several tubes are manifolded together. For the flow rates of this example, a total of 12 tubes of 5 inches (17.7 cm) inside diameter and 24 feet (7.3 m) long would be required.

The objective of the reforming reactor is to produce as much synthesis gas (a mixture of hydrocarbon and carbon monoxide) and particularly carbon monoxide as possible. The extent to which the carbon in the methane and carbon dioxide is converted to carbon contained in carbon monoxide is determined by the thermodynamic equilibrium of the water gas shift reaction:

$$H_2 + CO_2 \rightleftharpoons H_2O + CO \tag{11}$$

and the steam-methane reaction:

$$H_2O + CH_4 \rightleftharpoons 3H_2 + CO \tag{12}$$

The equilibrium constants for these reactions depend on the temperature of the gases leaving the reformer. Since reaction (12) involves an increase in moles as the reaction consumes methane, higher pressures adversely affect the extent of conversion of methane. The water-gas shift reaction readily achieves equilibrium on the nickel catalyst whereas the steam-methane reaction approaches to within about 16° C. (29° F.) of equilibrium, and the projected results are based on this phenomenon. For the present example with an exit gas temperature of 850° C. (1562° F.) and a pressure of 225 psia (1550 kPa) the gas leaving the reformer is comprised of 2.15 MMSCFD (60.879 m³/day) of hydrogen, 1.52 MMSCFD (43,040 m³/day) of carbon monoxide, 0.80 MMSCFD (22,653 m³/day) carbon dioxide, 0.08 MMSCFD (2265 m³/day) of methane and 1.29 MMSCFD (36,528 m³/day) of water.

These gases are cooled in preheater (not shown) to about 200° C. (392° F.) and then to 25° C. (77° F.) in water-cooled condenser (not shown) C1 where the water is condensed and removed in separator vessel (not shown).

The large carbon dioxide content (approximately 18%) of the gases leaving the separation vessel is undesirable for the synthesis reactor feed. Therefore, the next step in synthesis gas preparation is reduction of the carbon dioxide content to less than about 5% by volume, and in this example, to 2% by volume. This is accomplished in a carbon dioxide absorption column using a hot aqueous potassium carbonate solution which is converted to potassium bicarbonate upon reaction with carbon dioxide. The solution is continuously regenerated by pressure reduction (flashing) to approximately 2 psig (138 kPa) and boiling in stripper column ST1. The carbon dioxide removed in ST1 is compressed to 230 psia (1590 kPa) and recycled back to the reformer inlet. The gases leaving absorber ABS1 are cooled from 105° C. (221° F.) to 25° C. (77° F.) in water-cooled condenser (not shown) where the water vapor is condensed and removed in separator vessel (not shown).

Commercially available alternate means can be used for removing carbon dioxide such as ethanolamine systems. However, these alternate systems generally require higher operating pressures and temperatures and require a significantly greater amount of steam for regenerating the solution. After carbon dioxide removal, gas flows are the same except for carbon dioxide which is reduced to 0.016 MMSCFD (453 m³/day). The gases enter synthesis reactor which is a bubble column slurry reactor of the type described in detail by Kolbel and Ralek in *The Fischer-Tropsch Synthesis in the Liquid Phase*, Catalyst Review—Science Engineering, Vol. 21(2) pp. 225–274, (1980). The reactor contains a precipitated iron catalyst having a particle size in the range of 5 to 40 microns and suspended in a sulfur-free high melting point wax (m.p.>60° C. (140° F.)) or F-T Diesel (sulphur free medium). The slurry should contain about 10% by weight iron. The space velocity is 240 vol. per hour per volume of expanded catalyst slurry bed volume.

The overall reaction vessel size for this example is 4.5 feet (1.37 m) internal diameter and 45 feet (13.7 m) high. The reactor would contain approximately 20,000 pounds of wax and 3500 pounds of catalyst. This volume allows room for expansion of the slurry and a catalyst and wax disengaging section above the slurry. The reactor has internal cooling tubes for removing the large exothermic heat of reaction approximately 7000 Btu/Lb. of liquid produced (16,249 kj/kg). Water pumped into the tubes generates high pressure steam which can be used for process heat.

The gases entering the bottom of the synthesis reactor flow through a nozzle plate which produces small bubbles less than 1 mm in diameter. The bubbles rising in the slurry provide good mixing between the gas and liquid phases and between the liquid and solid phases. The reactor temperature is maintained at 250° C. (482° F.) and the operating pressure is controlled to 210 psia (1450 kPa) by back pressure regulator BPR. The products produced in the synthesis reactor along with the unconverted gases enter a fractionating distillation tower where the products are separated into three fractions: 36.0 barrels of naphtha-comprising molecules having carbon numbers between $C_5$ and $C_{10}$;27.7 barrels of diesel—$C_{11}$ to $C_{19}$ and 17.0 barrels of wax—$C_{20}+$.

The overhead gases contain a large amount of carbon dioxide which is produced in the synthesis reactor. To recover this carbon dioxide for reuse, the gases are fed to the carbon dioxide absorber. After the water is removed in a condenser and a separator vessel, the remaining light hydrocarbon gases, hydrogen and carbon monoxide flow through back a pressure regulator into the reforming furnace burner. Combustion air for the reformer is compressed with a blower and preheated using flue gases.

Table VIII lists the product yields and carbon efficiency along with operating parameters for Example 1 and several examples discussed below.

EXAMPLE 3

Example 3 is the same as Example 2, except that no carbon dioxide is recycled from either the reformer or the Fischer-Tropsch reactor back to the inlet of the reformer. In this case, the carbon conversion efficiency is only 36.8% and the yield of $C_5+$ product is only 51.8 barrels.

EXAMPLE 4

Example 4 is the same as Example 2 except that only carbon dioxide from the reformer is recycled back to the reformer inlet. The carbon conversion efficiency in this case is only 43.6% and the yield of $C_5+$ product is only 61.3 barrels. Comparing Examples 2, 3 and 4 demonstrates the advantage of recycling carbon dioxide from the Fischer-Tropsch reactor back to the (Example 3) inlet of the reformer. If no carbon dioxide recycle is employed, the efficiency is low, 36.8% and the $C_5+$ yield is also low, only 51.8 barrels. Adding carbon dioxide recycle from the reformer, (Example 4), improves the carbon conversion efficiency and $C_5+$ yield to 43.6% and 61.3 barrels, respectively. Only when carbon dioxide recycle from the Fischer-Tropsch is added as in the preferred system, Example 2, do dramatic increases in carbon conversion efficiency and $C_5+$ yield result. Note that in only the preferred system is the 50% carbon conversion efficiency as predicted by equation 4, exceeded.

EXAMPLE 5

Example 5 demonstrates the effect of recycling a fraction of all Fischer-Tropsch tail gases not just carbon dioxide. Here, half of the Fischer-Tropsch tail gases are recycled to the reformer inlet in an attempt to improve system performance by utilizing arbon dioxide and light hydrocarbon gases in the tail gas. This performance improvement is realized as the carbon efficiency increases from 58.1% in Example 1 to 60.5% in Example 5. Yield of $C_5+$ increases from 80.7 to 85.2 barrels/day. The disadvantage of this scheme is that gas flow rate into the reformer and Fischer-Tropsch reactor increase by about 50% thus increasing equipment costs significantly. If more than half the tail gas is recycled, equipment sizes increase very rapidly. In addition, high hydrogen-to-carbon monoxide ratios (input to Fischer-Tropsch reactor) result. Another disadvantage of this approach is the olefins contained in the tail gases require more steam to prevent carbon formation in the preheat heat exchanger and reformer.

EXAMPLE 6

In this example, an improvement is obtained over those obtained in Example 5 by utilizing practically all the carbon dioxide in the Fischer-Tropsch tail gas. Only 50% of the tail gases is recycled into the reformer but after first separating nearly all (98%) the carbon dioxide from the tail gas stream. Once again, the expected carbon efficiency and $C_5+$ yield increase significantly, to 71.3% and 94.6 barrel, respectively. Note also that gas flow into the reformer and Fischer-Tropsch are reduced from those employed in Example 5, thereby not requiring increases in equipment size to obtain the improved yields. Moreover, the high hydrogen to carbon monoxide ratio of Example 5 has been reduced from 3.54 to 2.50.

EXAMPLE 7

In this example, Example 7 is extended to 70% recycle of all Fischer-Tropsch tail gases, which will produce significant increases in carbon efficiency and $C_5+$ yield result, but at the expense of very large gas flows and excessive hydrogen to carbon monoxide ratios. It is possible that in an installation of these $C_5+$ yields could not be practically realized in an economically designed system, because the reformer heat input would increase beyond that available from combustion of the tail gases not recycled to the reformer inlet. A more practical economical limit appears to be closer to the 50% recycle of Example 5.

EXAMPLE 8

This example demonstrates the results from the use of the alternate method for reducing the high hydrogen to carbon monoxide ratios input to the Fischer-Tropsch reactor by removing some hydrogen from the gas stream with, for example, a membrane separator. Example 8 demonstrates the effect of removing sufficient hydrogen to restrict the hydrogen to carbon monoxide ratio to about 1.5 to 1. Comparing the results of Example 7, it can be seen that there is a loss of carbon efficiency and lower $C_5+$ yields. This can be attributed to the fact that the hydrogen is removed from the reaction stream and cannot contribute to production of hydrocarbons. A comparison with Example 6 shows how much more effective the method of recycling carbon dioxide from the Fischer-Tropsch reactor to the reformer to decrease $H_2$:CO ratio is compared to this example. Not only is the hydrogen retained in the system in Example 6, but there is a better use of the carbon input.

EXAMPLE 9

This example can be compared with Example 5 and demonstrates the effect of changes in alpha ($\alpha$), i.e. the probability of linear condensation. The alpha ($\alpha$) has been decreased to 0.7 and the effect is to significantly increase production of lighter hydrocarbons. The carbon efficiency and $C_5+$ yield decreased to 43.7% and 60.0 barrels, respectively because the reduction of alpha ($\alpha$) to 0.7 significantly increases production of $C_1$ through $C_4$ hydrocarbons at the expense of $C_5+$ fraction. It is noted, however, that although the $C_5$ fraction decreases, these light hydrocarbons can be used as chemical feed stocks.

EXAMPLE 10

This example, run as previous Example 5, increases the overall recycle of Example 6 to 70% retaining the low alpha ($\alpha$) of 0.7 of Example 10. In addition, sufficient light hydrocarbons are recycled and reacted to produce $C_5+$ yields and carbon efficiency of 79.3 barrels and 54.6% respectively. A combination of reduced alpha ($\alpha$) and overall recycle of Fischer-Tropsch tail gas is therefore a method of shifting the distribution of $C_5+$ hydrocarbons. Here again, one must consider the large gas flows which result and the limit imposed by reformer heating requirements as discussed under Example 7.

EXAMPLE 11

This example demonstrates that increasing the reformer operating temperature increases its performance and, therefore, performance of the complete system. The reformer operating temperature of the preferred system, Example 2, has been increased to 875° C. for this example. Comparing with Example 1, this produces approximately 5.5% more carbon monoxide thus increasing carbon efficiency to about 61.4% and increasing $C_5+$ yield to about 85.1 barrels. Practical implementation of this increase requires that one account for not only the higher energy cost of operating at the higher temperature, but also the decreased life of the reformer tubes, a major system expense.

Figure 4:
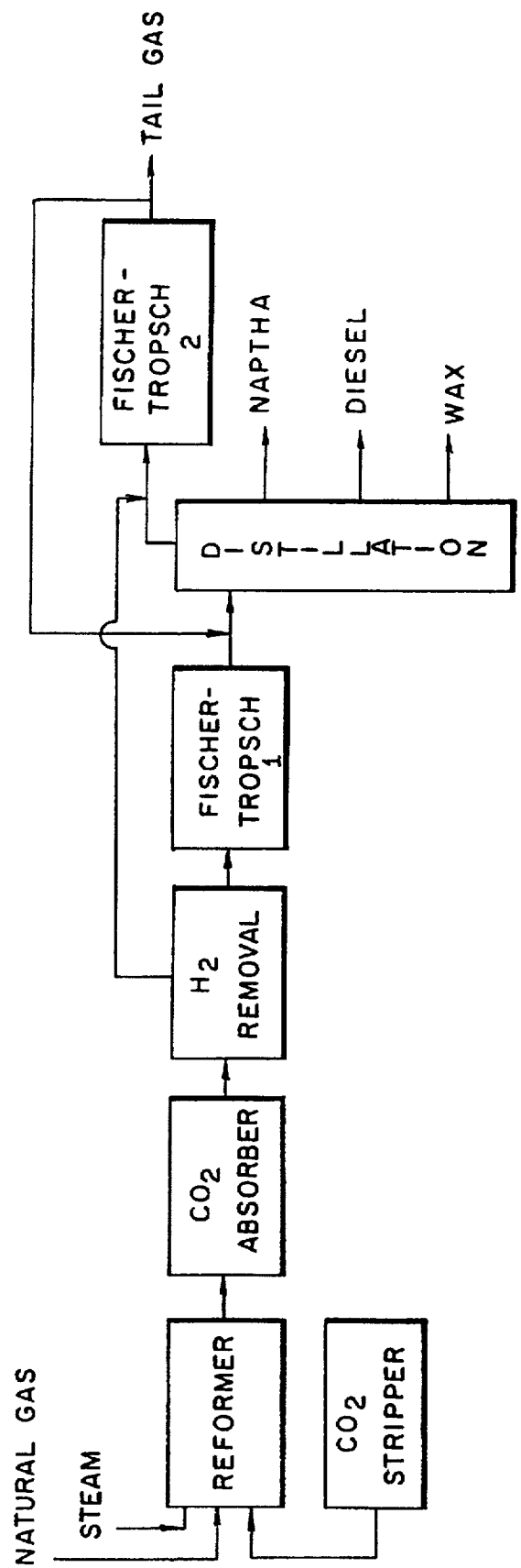
FIG. 4 is a schematic of still another embodiment of the system of the present invention.

An alternative method for improving carbon conversion efficiency by utilizing the carbon dioxide produced in the Fischer-Tropsch reactor has been discovered (See FIG. 4). It was found that the tail gases from the Fischer-Tropsch reactor which consist chiefly of hydrogen and carbon dioxide can be converted to liquid hydrocarbons in a second Fischer-Tropsch reactor according to the following reactions:

$$H_2 + CO_2 = H_2O + CO \text{ water-gas shift}$$

$$\frac{2n+1}{n} H_2 + CO \rightarrow \frac{1}{n} C_nH_{2n+1} + H_2O \text{ paraffins}$$

$$2_nH_2nCO \rightarrow C_nH_{2n} + nH_2O \text{ olefins}$$

In this case, the primary reaction is the water gas shift reaction which proceeds to equilibrium and corresponds to an extent of reaction from left to right of about 0/25 for temperatures of about 250° C. The carbon monoxide formed in the shift reaction reacts with excess hydrogen to produce hydrocarbons via the Fischer-Tropsch reactions. A test was conducted in a small slurry reactor using the same iron-based catalyst used in the conventional Fischer-Tropsch synthesis. The temperature, pressure and space velocity were also kept the same. The carbon dioxide conversion was 25% for a feed having hydrogen to carbon dioxide ratios of 2:1 and also for 1.5:1. Conversion of the hydrogen was 42%, and 88% of the carbon monoxide produced in the water gas shift reaction was converted to hydrocarbons in the Fischer-Tropsch reaction. The chain growth ($\alpha$) was the same as in the conventional Fischer-Tropsch synthesis.

This approach is particularly advantageous in systems which have excess carbon dioxide which would usually be vented to the atmosphere and which also have hydrogen removed in a membrane separator or pressure swing adsorption unit.

The following Table summarizes the various schematic illustrations in FIGS. 7 through 14 showing the expected yields possible in barrels per day.

TABLE IX

Typical Fischer-Tropsch Aqueous Phase Composition

| | |
|---|---|
| Water Content, wt. % | 87.5 |
| ASTM E203 | |
| Total Alcohols, Aldehydes and Keytones | |
| GC/MS, corrected by water content | |
| Methanol | 0.13 |
| Ethanol | 5.75 |
| 1-Propanol | 2.00 |
| 1-Butanol | 1.25 |
| 1-Pentanol | 0.63 |
| 1-Hexanol | 0.13 |
| Hydrocarbons | 0.63 |
| Acetic Acid | 1.25 |
| Ethyl Acetate | 0.13 |
| Acetaldehyde | 0.13 |
| Total Acid Number, mg KOH/g | 26.5 |
| ASTM D2849 | |
| Iron content, mg/l. | <0.05 |
| Atomic Absorption | |

TABLE VIII

ALTERNATIVE PROCESS CONFIGURATIONS
EQUIPMENT REQUIREMENTS AND PRODUCT YIELDS

Conditions:

*1.0 MMCFPD METHANE (CH4)
*8% MAX CO2 TO FT REACTOR VESSEL
*1.5:1 H2 to CO RATIO y = yes
n = no

* EQUIPMENT *

| RE FOR- MER | PART OXID. | CO2 ABS. #1 | CO2 ABS #2 | CO2 STRIP | CO2 COMP | H2 SCRUB | F-T GAS | TAIL COMP | F-T RECYCLE | DIST. COL. |
|---|---|---|---|---|---|---|---|---|---|---|
| Y | N | Y | N | Y | Y | Y | Y | N | N | Y |
| Y | N | Y | Y | Y | Y | Y | Y | N | N | Y |
| Y | N | Y | N | Y | Y | Y | Y | Y | N | Y |
| Y | N | Y | N | Y | Y | Y | Y | N | Y | Y |
| Y | N | Y | Y | Y | Y | Y | Y | N | Y | Y |
| N | Y | N | N | N | N | N | Y | Y | Y | Y |
| N | Y | Y | N | Y | Y | Y | Y | Y | Y | Y |

* PRODUCTS *

| YIELD B/D (C7+) | SURPLUS ENERGY (MMBTUPD-LHV) |
|---|---|
| 39.97 | 226 |
| 69.38 | 0 |
| 60.98 | 0 |
| 77.96 | 0 |
| 82.93 | 0 |
| 100.05 | 0 |
| 106.03 | 0 |

Finally it has been observed that the aqueous phase removed from distillation contains a significant amount of alcohols and other oxygenated compounds (see Table IX). In general, it will not be economical to attempt to concentrate and recover the alcohols. One approach for disposing of this aqueous phase is to recycle it to the reformer feed whereby the water will contribute to the steam requirement and the oxygenated compounds will undergo reaction in the reformer to produce additional hydrogen and carbon monoxide.

It is within the skill in the art to practice this invention in numerous modifications and variations in light of the above teachings. It is, therefore, to be understood that the various embodiments of this invention described herein may be altered without departing from the spirit and scope of this invention as defined by the appended claims and the pertinent prior art.

What is claimed is:

1. The process for the conversion of a hydrocarbon gas stream into products including liquid hydrocarbons comprising the steps of:

first, catalytically reacting the hydrocarbon gas in a first reaction zone in the presence of water and sufficient carbon dioxide to produce hydrogen and carbon monoxide product in a ratio of hydrogen to carbon monoxide of from about 0.5 to about 2.0 to 1 and then removing carbon dioxide from the hydrogen and carbon monoxide produced in this step and recycling at least a portion of this carbon dioxide back to the first reaction zone;

second, catalytically reacting the hydrogen and carbon monoxide having a reduced carbon dioxide content in a second reaction zone in the presence of a slurry containing an alkali promoted iron-based catalyst under conditions favoring the formation of carbon dioxide, light hydrocarbon gases, and normally liquid hydrocarbons containing at least five carbon atoms, and hydrocarbon waxes, and then separating the liquid hydrocarbon products from the gaseous products; and third, reacting the gaseous products in a third reaction zone in the presence of a slurry containing an alkali promoted iron-based catalyst to produce additional liquid hydrocarbon product.

2. The process of claim 1 wherein the ratio of carbon from the hydrocarbon gases first reacted to carbon dioxide is one part of carbon from hydrocarbon gas to up to two parts of carbon dioxide.

3. The process of claim 2 wherein the ratio of carbon from hydrocarbon gas to carbon dioxide and water is one part of carbon from the hydrocarbon gas to four parts of carbon dioxide and water.

* * * * *